United States Patent [19]

Chou

[11] Patent Number: 5,610,843
[45] Date of Patent: Mar. 11, 1997

[54] METHODS AND APPARATUSES FOR MULTI INPUT/MULTI OUTPUT CONTROL SYSTEMS

[75] Inventor: Kenneth C. Chou, San Francisco, Calif.

[73] Assignee: SRI International, Menlo Park, Calif.

[21] Appl. No.: 399,695

[22] Filed: Mar. 1, 1995

[51] Int. Cl.⁶ .................................................. G05B 11/58
[52] U.S. Cl. .......................................... 364/553; 364/149
[58] Field of Search .................................. 364/148, 149, 364/151, 164, 165, 176, 221.1, 553, 574; 381/94, 71; 324/615

[56] References Cited

PUBLICATIONS

Bendat, Julius S. & Piersol, Allan G., "Ramdom Data: Analysis and Measurement Procedures," Wiley–Interscience, 1971, pp. 286–343.
Bennett, W. H., "Digital Signal Processing Methods For Control of Vibrations in Structures," Technomic Publishing Co., Inc., 1991, pp. 783–795.
Beylkin, G., Coifman, R., & Rokhlin, V., "Fast Wavelet Transforms and Numerical Algorithms I," John Wiley & Sons, Inc., 1991, pp. 141–183.
Chiang, Richard Y., Safanov, Michael G., "Robust Control Toolbox," The Math Works, Inc., 1988, pp. R1–R65.
Golub, Gene H., Van Loan, Charles, F., "Matrix Computation," The John Hopkins University Press, 1983, pp. 125–133.
Ko, Jeonghwan, Kim, Cheolho, Kurdila, Andrew J., Strganac, Thomas W., "Wavelet Galerkin Methods for Game Theoretic Control of Distributes Parameter Systems," American Institute of Aeronautics and Astronautics, Inc., 1993, pp. 3437–3447.

Ljung, Lennart, "System Identification: Theory for the User," Prentice–Hall, Inc. 1987, pp. 358–391.
Mallat, Stephane G., "Multifrequency Channel Decompositions of Images and Wavelet Models," Computer Science Department, Courant Institute of Mathematical Sciences, 1989, pp. 2091–2110.
Mallat, Stephan G., "A Theory for Multiresolution Signal Decomposition: The Wavelet Representation," Computer Science Department, Courant Institute of Mathematical Sciences, 1989, pp. 674–693.
Chou et al., "Partially–Interconnected Q–Parameter Feedback Control System Design Memorandum," Applied Control & Signal Processing Group, Jan. 31, 1994, pp. 1–11.
Rioul et al., "Wavelets and Signal Processing," IEEE SP Magazine, Oct. 1991, pp. 14–38.
Daubechies, Ingrid, "Orthonormal Bases of Compactly Supported Wavelets," Communications on Pure & Applied Mathematics, vol. XLI 909–996, 1988, pp. 909–996.

*Primary Examiner*—James P. Trammell
*Assistant Examiner*—Tony M. Cole
*Attorney, Agent, or Firm*—Hickman Beyer & Weaver

[57] ABSTRACT

Apparatuses and methods for implementing a controller in a system having a plurality of sensors and a plurality of actuators. In one embodiment, the inventive method includes the steps of measuring a transfer function P, the measured transfer function P representing a neutralization path in a Q-parameterized version of the controller, and designing a transfer function Q, the designed transfer function Q representing the feed forward path in the Q-parameterized version of the controller. The invention further includes the step of sparsifying both the transfer functions P and Q for a given accuracy threshold using wavelet transforms, thereby forming transfer functions Ps and Qs respectively for implementing the controller.

29 Claims, 12 Drawing Sheets

(FEED FORWARD)

METHODS AND APPARATUSES FOR MULTI INPUT/MULTI OUTPUT CONTROL SYSTEMS

BACKGROUND OF THE INVENTION

The present invention relates generally to methods and apparatuses for implementing a multi-input/multi-output (MIMO) control scheme. More particularly, the invention relates to methods and apparatuses for implementing a MIMO controller based on a multiscale hierarchy.

In control problems where one is attempting to affect the behavior of a system through the use of feedback, the controller typically takes as inputs what is measured from a set of sensors, performs some transformation on those inputs through some known control law, then outputs signals that drive a set of actuators for implementing the desired control strategy. This general scheme is used, for example, in vibration control where the goal might be to still the vibrations on a structure. The sensors might pressure the acceleration at certain points on the structure, while the actuators may be shakers on the structure, acting in response to sensor measurements to counteract some measured disturbance.

Another example is active noise control where one might want to control the noise in a certain space. The sensors may be, for example, microphones that measure the noise source, while the actuators may be, for example, speakers that generate signals that cancel the noise. Both of these examples illustrate the case of controlling a spatially distributed set of variables. In the case of vibration control the variables considered may be acceleration on the surface of a structure, while in the case of active noise control the variables may be the sound pressure in a room.

One of the primary challenges of controlling a spatially distributed set of variables is in being able to handle the potentially large number of sensors and actuators required to control this set. The fact that the domain of this set is typically a continuum over a surface or a 3-dimensional volume while the sensors and actuators comprise a discrete set often implies the need for large numbers of sensors and actuators for control. By way of example, an emerging technology known as smart materials involves composite materials having embedded within its structures sensors and actuators for the purpose of sensing its environmental conditions and implementing control. In the case of vibration control, for example, these smart materials might contain a dense grid of miniature accelerometers and miniature piezoceramic actuators imbedded below the surface of the materials.

For digital control systems, the challenge of controlling a large system of sensors and actuators is in being able to, at each sample in time, take the inputs from the sensors, compute the necessary control signals as a function of these inputs, and output the control signals to drive the actuators. It is the computation of the control signals in real-time and, in the case of distributed processing schemes, the communication of results between processors that presents the main obstacle to controlling systems with large numbers of inputs and outputs. This computational bottleneck, both in terms of computational complexity and interprocessor communication, presents a major limitation on the performance of current control system designs on multi-input/multi-output systems, especially if a large number of sensors and actuators are involved.

To further elaborate on the challenges and issues involved in the design of an efficient controller for a large-scale multi-input/multi-output system, consider the example of FIG. 1. FIG. 1 shows in a simplified format a physical system for the purpose of introducing terms and concepts relevant to the disclosure herein. Referring now to FIG. 1, shown is a beam 102 representing the physical system on which a vibration control scheme is to be implemented, e.g. the vibration of which needs to be controlled. Beam 102 is acted upon by a forcing function 104, which impacts the beam at some arbitrary location on the beam at some arbitrary point in time. In the example of FIG. 1, one end of beam 102 is clamped to a relatively immobile structure 106, e.g. a solid wall. For illustration purposes, the other end of beam 102, i.e. the unclamped end, is impacted by forcing function 104 as shown. Forcing function 104 may be a one time impulse or periodic in time. For ease of illustration, it is assumed herein that forcing function 104 is a one time impulse although the control concepts disclosed herein are equally applicable to forcing functions having a periodic or any other time-varying nature.

Also shown in FIG. 1 are a plurality of sensors 108 for measuring the disturbance caused by forcing function 104 at fixed positions on beam 102. Each of the sensors 108 may, for example, represent an accelerometer that provides a voltage output which is proportional to the local acceleration experienced at its respective location on beam 102. The specific type of sensor used is not particularly relevant to the inventive concepts disclosed herein, and sensors 108 may, in fact, be implemented by any of a number of well known and widely available sensors that measure, for example, acceleration, displacement, impact, and the like.

There are also shown in FIG. 1 a plurality of actuators 110 acting on beam 102 to counteract the disturbance caused by forcing function 104. Actuators 110 may utilize hydraulic, electromechanical, piezo electric, or other suitable elements to transfer force onto beam 102 to still beam 102, thus counteracting the disturbance. It should be noted that although a beam example is chosen to define terms and to illustrate the overall inventive concept in this disclosure, the inventive control apparatuses and methods of the present invention may be adapted to work with any generalized physical system, including systems having any arbitrary number of sensors and actuators, whether implemented in one, two or three-dimensional space. It should be further noted that in the example of FIG. 1, as well as in any generalized physical system, there is no requirement that the number of actuators must equal the number of sensors. In fact, FIG. 1 shows a beam example in which there are more sensors 108 than actuators 110.

In operation, when forcing function 104 impacts beam 102 with its disturbance impulse, beam 102 typically experiences an initial disturbance that can be measured by various ones of sensors 108. Measurements taken by sensors 108 are then fed into a controller (not shown in FIG. 1). The controller then outputs a plurality of control signals for controlling individual ones of actuators 110, causing actuators 110 to act on, e.g. impact, beam 102 to counteract the disturbance experienced by sensors 108. If the controller is correctly designed, the disturbance sensed at beam locations where sensors 108 are located preferably approaches or reaches zero following actions by actuators 110.

In a general prior art control scheme, every sensor, e.g. every one of sensors 108, is designed to be capable of directly communicating with any actuator, e.g. any of actuators 110, and vice versa. This is because a disturbance in one part of the physical system may be measured by a sensor located in another part of that physical system. Further, the disturbance experienced in one part of the physical system may be effectively counteracted by one or more actuators located in a different part or different parts of that physical system.

If the physical system is small, i.e. the provided number of sensors and actuators is small, the number of interconnections between sensors and actuators may be manageable. Consequently, the computational bottleneck, both in terms of computational complexity and interprocessor communication, in mapping a small number of sensors into a small number of actuators, may be tolerable.

In large physical systems, e.g. a building structure, an aircraft wing, a sizable sample of smart material, and the like, the number of sensors and actuators may be in the thousands. When there are a large number of sensors and actuators, the number of interconnections becomes unwieldy. Merely interconnecting the large number of sensors and actuators together presents a significant engineering problem. Furthermore, even if those interconnections could be realized, the sheer number of computations that are required to derive control signals for the large number of actuators from all sensor outputs represents an obstacle to the realization of a real-time control system. Even if this large number of computations can be divided among many processors, the large number of interconnections exacerbates the interprocessor communication problem.

To ease the task of designing controllers, various techniques and models have been proposed. In one prior art method, a general control problem is modeled as a system of transfer functions. FIG. 2 shows in a simplified block diagram format a control system block diagram showing a plurality of blocks representing transfer functions. Referring now to FIG. 2, there is shown a transfer function S (120), representing the transfer function that maps the forcing variables, e.g. forcing function 104 of FIG. 1, into a plurality of sensor outputs. The sensor outputs from transfer function S is combined by a summer element 124 with outputs from a transfer function P (122), which represents the transfer function that maps actuator inputs into sensor outputs. Transfer function K (126) represents the user designed controller. In the physical world, transfer function K (126) may be implemented by any number of electronic or real-time digital elements, including microprocessors. Transfer function K (126) takes as its input values from summer element 124 and outputs values representing control signals for controlling actuators, e.g. actuators 110 of FIG. 1. In the diagram of FIG. 2, transfer function K (126) is in a feedback loop to increase robustness with respect to uncertainties in the physical system modeled by the control system block diagram of FIG. 2.

Transfer function A (128) maps the actuator inputs into the variable to be controlled, e.g. sensor output(s) that measures performance of the controller represented by transfer function K (126). The sensors that measure performance may be a subset of the sensors corresponding to transfer function S (120) or a set which may include other sensors as well. Transfer function T (130) represents the response to be matched by the control path and is in FIG. 2 a physical transfer function that maps the disturbance into a transformed version of the disturbance at some physical locations. By way of example, if the control system of FIG. 2 is used to implement active noise control, the outputs of transfer function T (130) may represent the noise level at certain points in the room at which noise suppression is desired.

The sum of the outputs of transfer functions A (128) and transfer functions T (130), whose sum is produced by summer element 132, represents the sensor outputs that measure performance. When controller K is properly designed, the value produced by summer element 132 preferably approaches or is at zero after the system's actuators are activated, signifying that the actuators of the system successfully counteract the disturbance caused by the forcing function. It should be noted that the control system block diagram of FIG. 2 is intended to be general and is applicable to any control system without regard to the number of sensors and actuators contained therein. In particular, the control system block diagram of FIG. 2 is suitable for modeling control systems in which there are an arbitrary number of sensors and actuators.

In mathematical terms, the overall closed-loop transfer function in FIG. 2 from input to output, denoted G herein, is expressed as follows.

$$G = T + A(I - KP)^{-1}KS \tag{1}$$

where I denotes the identity matrix.

Further, the control problem can be stated in terms of an optimization problem in which the optimal controller is the solution to the minimization of the norm of the transfer function G with respect to K.

$$\min_{K} \|G\| \tag{2}$$

Constraints to this optimization problem include requiring stability of G as well as ensuring robustness of the design with respect to unmodeled errors in the transfer functions (T,S,A,P). Furthermore, K must be causal, i.e. realizable. Because of the highly non-linear dependence of G on K, solutions to such a constrained optimization problem are often extremely difficult to obtain.

One prior art method of simplifying the overall optimization problem involves the use of a Q-parameterization of the controller K. For additional information, reference should be made to B. Francis, *A Course in H∞ Control Theory*, Springer-Verlag, 1987, incorporated herein by reference for all purposes.

Referring now to FIG. 3, there is shown in a simplified block diagram format a realization of a controller, e.g. transfer function K(126) of FIG. 2, using the above-mentioned Q-parameterization technique. In general, controller K may be implemented using two main transfer functions: Q (150) and P(160). Transfer function Q(150) represents the mapping from sensor outputs into actuator inputs, which is sometimes referred to as the feed-forward control path. Transfer function P (160), on the other hand, represents the mapping from actuator inputs to sensor outputs, and is sometimes referred to as the neutralization path. In the ideal case, transfer function P (160), when modeled accurately, is the same as transfer function P (122) of FIG. 2. The output of transfer function P (160) is fed, along with sensor outputs, e.g. outputs of transfer function S (120) of FIG. 2, into a summer element 170, the output of which serves as the input into transfer function Q (150).

Mathematically speaking, K may be parameterized as follows.

$$K = (I + QP)^{-1}Q \tag{3}$$

As discussed in the aforementioned reference by B. Francis, the basic theorem resulting from this parameterization is as follows. For a stable transfer function P in FIG. 2, the collection of stable transfer functions Q's in eq. (3) parameterize the set of transfer functions K's that stabilize the closed-loop system G.

By substituting eq. (3) into eq. (1), the following expression for G is derived:

$$G = T + AQS \quad (4)$$

In other words, G has been transformed from a nonlinear function of K into an affine function of Q. Furthermore, as pointed out in the aforementioned B. Francis reference, the overall optimization problem as stated in eq. (2) reduces to the following model matching problem:

$$\min_Q \|T + AQS\| \quad (5)$$

If Q is restricted to be stable, then, via the Q-parameterization theorem, the requirement that the overall closed-loop system G be stable is satisfied.

For practical designs, however, a controller should be robust to unmodeled errors in the overall system. Indeed, one of the main reasons for designing feedback systems is to make a system insensitive to modeling errors or changes in plant parameters. For example, consider the case where there are additive plant errors.

$$P' = P + D \quad (6)$$

where P represents the nominal plant, D is a transfer function that represents a frequency-dependent additive error, and P' is the true plant. In this case, the loop gain of the system, G, is equal to DQ and by the small gain theorem, the following is a sufficient condition for stability of G given the nominal plant P and the plant errors as in eq. (6).

$$\|DQ\|_\infty < 1 \quad (7)$$

where the ∞-norm of a matrix transfer function is defined to be the supremum of the maximum singular value of the matrix over all frequencies. For further information regarding the derivation of eq. (7), reference should be made to J. C. Doyle, B. A. Francis, A. R. Tannenbaum, *Feedback Control Theory*, Macmillan, New York, 1992.

From the above, the robust control design problem then becomes one of using the nominal plant transfer function P as a plant model and solving the following constrained optimization problem.

$$\min_Q \|T + AQS\| \quad (8)$$

$$\|DQ\|_\infty < 1$$

The constraint ensures that the design is stable in the presence of the error D added to the plant P. Examples of specific norms used in $$\min_Q \|T + AQS\|$$

include the ∞-norm and the 2-norm.

Consider the computational complexity of realizing a controller as given in eq. (3). One of the main difficulties in implementing a controller with large numbers of sensors and actuators is the fact that it is necessary to map dynamically all of the sensor outputs into all of the actuator inputs. In the Q-parameterization realization of the controller, the implementation problem divides into two tasks: 1) Implementing P as a transfer function from actuator inputs to sensor outputs, and 2) Implementing Q as a transfer function from sensor outputs to actuator inputs.

If P and Q are full matrices over a wide band of frequencies, the computational complexity of implementing a controller with large numbers of sensors and actuators becomes significant. For example, suppose P and Q were implemented as matrix finite impulse response (FIR) filters and there were Ns sensors and Na actuators. The number of multiplications and additions required to perform a single tap filter operation in a fully-interconnected controller is 2Ns Na.

The complexity of implementing a controller in which all sensors and actuators are fully interconnected is illustrated graphically in FIG. 4A. FIG. 4A shows a greatly simplified realization of transfer function Q (from sensor outputs to actuator inputs) for a controller which attempts to connect every sensor to every actuator. The connection of every sensor to every actuator represents the attempt to account for the interdependence nature of sensors and actuators in a physical system, in which a disturbance on one part of the system may be measurable by a sensor located in another part of the system, and perhaps most effectively counteracted by actuators located in yet another location. For ease of illustration, only four sensors S and four actuators A are shown. As is apparent from the number of interconnections from the S's to the A's, when every sensor S is connected to every actuator A, the total number of connections equals the number of S multiplied by the number of A or 16 in the case of the greatly simplified system of FIG. 4A.

In a fully-interconnected controller system with 1,000 sensors and 1,000 actuators, the number of connections for implementing transfer function Q alone is then 1,000×1,000, or 1,000,000. If P is also implemented, using a different connection network or the same network through some multiplexing scheme, e.g. time or frequency multiplexing, the total number of communication paths is now 2,000,000. Implicit in the foregoing, the number of computations that must be made in the Q-parameterized control system of the above example to map sensor outputs into controller inputs is 2,000,000 per sample in time. The large number of computations that must be made significantly increases the total time it takes to map the fully-interconnected sensors and actuators into one another, thereby preventing the efficient implementation of a real-time control system.

If multiple processors are used to distribute the computational burden in implementing a fully-interconnected large-scale MIMO control system, interprocessor communication among a large number of processors presents yet another problem. Consider the fully-interconnected implementation of transfer function P of FIG. 4B in which a plurality of processors C1–C4 are utilized to improve the speed at which the controller implemented by transfer function P can map actuator outputs into sensor inputs. For ease of illustration, only partial connections are shown.

In the controller scheme of FIG. 4B, there is provided one processor for each actuator. Consequently, each processor is responsible for mapping the output of only one actuator, instead of all actuators if the system were implemented with a single processor, to all sensors. Although processor C1 maps the output of only actuator A1 into the inputs of sensors S1–S4, it must be synchronized with other existing processors via communication paths which are represented by the interconnected lines between processors. This is because there must be some mechanism by which data from the different actuators, via their associated processors, can be coordinated and computed to accomplish mapping into each sensor. As is apparent, although the use of multiprocessors reduces the amount of computations that must be performed by any one processor in a fully-interconnected controller scheme, the problem of coordinating the multiple interconnections remains and continues to present obstacles to the implementation of an efficient, robust real-time MIMO control scheme.

SUMMARY OF THE INVENTION

This invention provides a methodology for alleviating the computational bottleneck, both in terms of computational complexity and interprocessor communication, and, thus, provides a method for designing and implementing control systems involving larger numbers of sensors and actuators. The invention involves using fast transforms for efficiently mapping a large number of inputs into a large number of outputs. The invention prescribes a controller architecture that is highly scalable and highly conducive to regularly structured multiprocessor schemes. Our approach is based on a multiscale hierarchy for the controller in which the specific multiscale structure is governed by the characteristics of our control system transfer functions.

The invention advantageously involves a strategic reduction of interconnections among sensors and actuators in a MIMO system to achieve computational efficiency without unduly sacrificing performance. The reduction is performed in accordance with a sparsification strategy whereby interconnections are analyzed using a multiscale hierarchy and eliminated if their strengths fall below a predefined threshold. In this manner, the omission of interconnections are not done in a random manner so as to result in an unstable system and/or unacceptable performance.

In one embodiment, the invention relates to a method for implementing a controller in a system having a plurality of sensors and a plurality of actuators, which includes the steps of measuring a transfer function P, the measured transfer function P representing a neutralization path in a Q-parameterized version of the controller, and designing a transfer function Q, the designed transfer function Q representing the feed forward path in the Q-parameterized version of the controller. The invention further includes the step of sparsifying both the transfer functions P and Q for a given accuracy threshold using wavelet transforms, thereby forming transfer functions Ps and Qs respectively for implementing the controller.

In one embodiment, the sparsifying step further includes the step of computing a transfer function $\tilde{P}=X_1 P X_r^{-1}$ wherein P representing the measured transfer function P, $X_1$ represents the forward wavelet transforms on outputs of the plurality of sensors, and $X_r^{-1}$ represents the inverse wavelet transforms for deriving inputs of the plurality of actuators.

In yet another embodiment, the sparsifying step further includes the step of thresholding the transfer function $\tilde{P}$ for a given accuracy threshold, thereby deriving a transfer function $\overline{P}$. In accordance with yet another embodiment, the sparsifying step further comprises the step of deriving transfer function $P_s$ from the transfer function $\overline{P}$, the transfer function $P_s$ being derived in accordance with the following equation:

$$P_s = X_1^{-1} \overline{P} X_r$$

wherein the transfer function $P_s$ represents a sparsifted version of the transfer function P.

In accordance with yet another embodiment, the invention relates to an apparatus for controlling multiple actuators in response to outputs from multiple sensors, which includes a feed-forward path, the feed-forward path representing direct communication paths from a first plurality of nodes, the first plurality of nodes representing transform coefficients of a sensor output wavelet transform lattice to a second plurality of nodes, the second plurality of nodes representing transform coefficients of a actuator input wavelet transform lattice. The inventive apparatus further includes a neutralization path, the neutralization path representing direct communication paths from a third plurality of nodes, the third plurality of nodes representing transform coefficients of an actuator input wavelet transform lattice to a fourth plurality of nodes, the fourth plurality of nodes representing transform coefficients of a sensor output wavelet transform lattice.

The invention also relates, in one embodiment, to a method, in a digital computer, for implementing a controller in a system having a plurality of sensors and a plurality of actuators. The method includes the steps of measuring a transfer function P, the measured transfer function P representing a neutralization path in a Q-parameterized version of the controller, and designing a transfer function Q, using a processor of the digital computer, the designed transfer function Q representing the feed forward path in the Q-parameterized version of the controller. The inventive method further includes the step of sparsifying both the transfer functions P and Q, using the processor, for a given accuracy threshold using wavelet transforms, thereby forming transfer functions Ps and Qs respectively for implementing the controller.

In yet another embodiment, the invention relates to a method for implementing a controller in a multi-input/multi-output system, which includes the steps of measuring a transfer function P, the transfer function P representing the neutralization path in a Q-parameterized version of the controller, and designing a transfer function Q the transfer function Q representing the feed forward path in the Q-parameterized version of the controller. The inventive method further includes the steps of deriving transfer function $\tilde{P}$ from the measured transfer function P, a transfer function $X_1$ and a transfer function $X_r^{-1}$, the transfer functions $X_1$ and $X_r^{-1}$ representing wavelet transforms, deriving transfer function $\tilde{Q}$ from the measured transfer function P, a transfer function $X_1^{-1}$ and a transfer function $X_r$, the transfer functions $Y_1$ and $Y_r^{-1}$ representing wavelet transforms, and thresholding the transfer function $\tilde{P}$ with respect to a given accuracy threshold, thereby deriving a transfer function $\overline{P}$. In one embodiment, the method further includes the step of thresholding the transfer function $\tilde{Q}$ with respect to the given accuracy threshold, thereby deriving a transfer function $\overline{Q}$, deriving a transfer function Ps from the transfer function $\overline{P}$, deriving a transfer function Qs from the transfer function $\overline{Q}$, and implementing the controller via Q-parameterization using the transfer function $P_s$ and $Q_s$.

It should be appreciated that the various embodiments may be used either standing alone or in combination with one or more of the others. The described systems may be used regardless of whether the downstream signals are also discrete multi-tone. In several preferred embodiments, the bidirectional data transmission system is a cable system that includes the transmission of signals over a coaxial cable, although other systems are contemplated as well.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE INVENTION

Physical Embodiment

It should be noted that the invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, coefficients, scales, or the like. It should be remembered, however, that all of these and similar terms are to be associated with the appropriate physical quantities and are merely convenient labels applied to these quantities.

Further, the manipulations performed are often referred to in terms such as identifying, mapping, thresholding, transforming, connecting, communicating, and the like. In any of the operations described herein that form part of the present invention, these operations are machine operations. Useful machines for performing the operations of the present invention include general purpose digital computers or other similar devices. In all cases, there should be borne in mind the distinction between the method of operations in operating a computer and the method of computation itself. The present invention relates, in part, to method steps for operating a computer in processing electrical or other physical signals or quantities to generate other desired physical signals or quantities.

Figure 5:
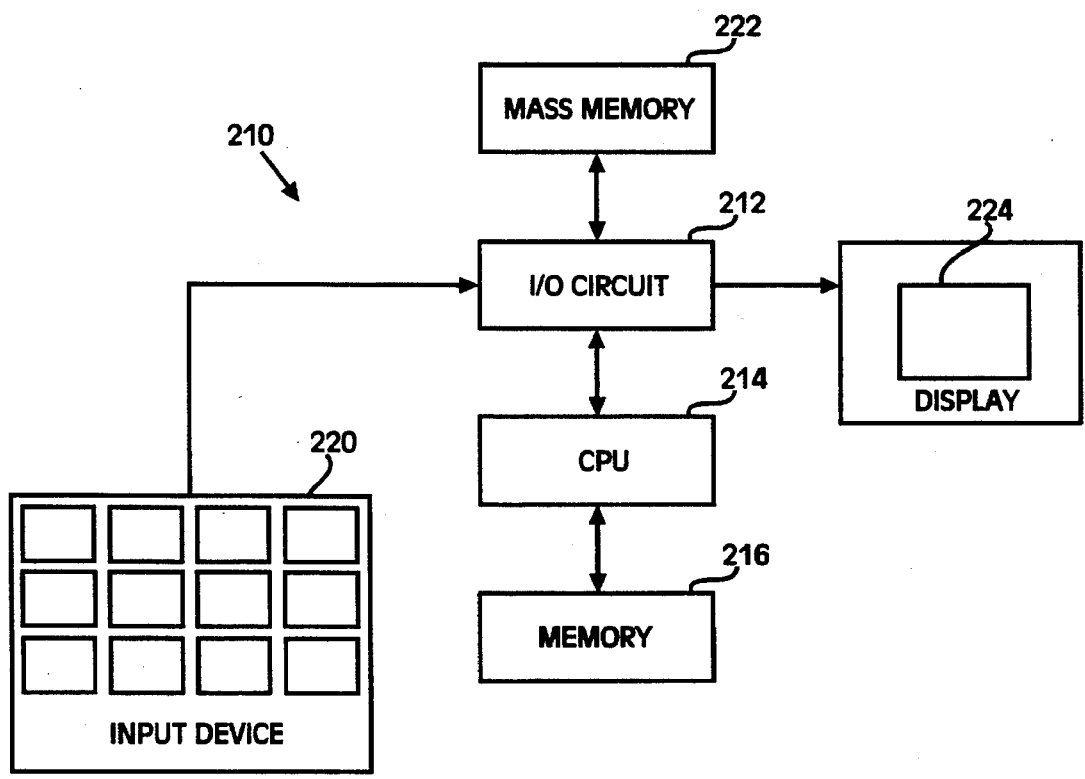
FIG. 5 shows a typical computer-based system according to the present invention.

The present invention also relates to an apparatus for performing these operations. This apparatus may be specially constructed for the required purposes, or it may be a general purpose computer selectively activated or reconfigured by a computer program stored in the computer. Although a particular computer may be selected for illustration purpose, the processes presented herein are not inherently related to any particular computer or other apparatus. In particular, various general purpose machines may be used with programs written in accordance with the teachings herein, or a more specialized apparatus may be used to perform the required method steps. The required structure for a variety of these machines will appear from the description given below. Architecture and Operation of the Apparatus and Method FIG. 5 shows a typical computer-based system according to the present invention. Shown is a computer 210 which comprises an input/output circuit 212 used to communicate information in appropriately structured form to and from the parts of computer 210 and associated equipment, a central processing unit (CPU) 214, and a memory 216. CPU 214 may represent, for example, a SPARC chip available from Sun Microsystems, Inc., Mountain View, Calif., microprocessors such as one of the Intel X86 or Motorola 680XX family of chips, or a reduced instruction set computer (RISC) chip such as the PowerPC microprocessor available from Motorola, Inc. These components are those typically found in most general and special purpose computers 210 and are intended to be representative of this broad category of data processors.

FIG. 5 also illustrates an input device 220 shown as a keyboard. It should be understood, however, that the input device 220 may actually be a transducer card reader, a magnetic or paper tape reader, a tablet and stylus, a voice or handwriting recognizer, or some other well-known input device such as, of course, another computer. A mass memory device 222 is coupled to the input/output circuit 212 and provides additional storage capability for the computer 210. The mass memory device 222 may be used to store programs, data and the like and may take the form of a magnetic or paper tape reader or some other well known device. It will be appreciated that the information retained within the mass memory device 222, may, in appropriate cases, be incorporated in standard fashion into computer 210 as part of the memory 216.

In addition, a display monitor 224 is illustrated which is used to display the images being generated by the present invention. Such a display monitor 224 may take the form of any of several well-known varieties of cathode ray tube displays or some other well known type of display.

As is well known, the memory 216 may store programs which represent a variety of sequences of instructions for execution by the central processing unit 214. For example, the optimizing programs for generating sparsified versions of transfer functions P and Q may be stored within the memory 216.

The present invention alleviates the computational bottleneck mentioned above, in terms of computational complexity and interprocessor communication, by using wavelet transforms to make sparse transfer functions Q (150) and P (160), thereby facilitating the implementation of a controller in which certain interconnections between certain sensors and actuators may be omitted without unduly impacting controller performance. In accordance with the invention, wavelets are applied to transfer functions which may be measured, therefore allowing a practical design method. The approach is based on a multiscale hierarchy for the controller in which the specific multiscale structure is governed by the characteristics of the control system transfer functions.

CHANGE OF BASIS FOR CONTROL PROBLEM:

The problem of simplifying the computations required to implement a controller K via a change of basis in both the space of sensor outputs, i.e. the outputs of the transfer function S (120), as well as the space of actuator inputs, i.e. the inputs of the transfer function A (128), is addressed as follows. In accordance with the present invention, the reduction in the computational requirements of a controller via a change of basis comprises mainly of 1) using basis transformations to decouple both the neutralization and feedforward transfer functions, i.e. making the transformed transfer functions P (160) and Q (150) sparse and 2) using basis transformations that are computationally efficient and structured in such a way as to be easily implementable in digital hardware.

From the previous section and in particular from the parameterization of the controller K as given in eq. (3), there are two matrix transfer functions, namely, P and Q, for which basis transformations may be applied as a way of simplifying implementation. For control applications, P and Q are in general full transfer function matrices over the band of interest, necessitating fully-interconnected systems in the prior art for implementation of the Q-parameterization of controller K. The intent of performing basis transformations on these transfer functions, P and Q, is to sparsify the required interconnections via highly structured, computationally efficient basis transformations. To that end, the following transfer functions, $\tilde{P}$ and $\tilde{Q}$, are defined thusly.

$$\tilde{P} = X_l P X_r^{-1} \quad (9)$$

$$\tilde{Q} = Y_l Q Y_r^{-1} \quad (10)$$

Note that for both P and Q, separate basis transformations are performed for the domain and range of each respective matrix transfer function. Indeed, neither P nor Q is necessarily square. Note, however, that in the case of square P (Q), where $X_r^{-1} = X_l^{-1} (Y_r^{-1} = Y_l^{-1})$, X and Y can be viewed as similarity transformations.

The efficiency of a change of basis in reducing computational complexity depends on a) the sparseness of the matrix transfer functions $\tilde{P}$ and $\tilde{Q}$, i.e. the non-zero entries of $\tilde{P}$ and $\tilde{Q}$, representing the interconnections required in realizing $\tilde{P}$ and $\tilde{Q}$ and b) the computational complexity of the basis change transformation. To see this more explicitly, consider that the implementational requirements of a system implemented in bases X and Y can be divided into the following two tasks, which correspond to the two tasks as defined in the previous section for implementing the controller K.

1. Neutralization:

$$X_l^{-1} \tilde{P} X_r \quad (11)$$

2. Feed-forward:

$$Y_l^{-1} \tilde{Q} Y_r \quad (12)$$

To sparsify the control transfer functions P and Q using basis transformations, the present invention advantageously develops a methodology for trading off sparsity of the transformed transfer functions with both computational and implementational complexity of the transformations. The methodology is based on tools developed in the context of wavelet transform theory. A suitable discussion of wavelet and its applications is O. Rioul and M. Vetterli, "Wavelets and Signal Processing," IEEE Signal Processing Magazine, Vol. 8, No. 4, October 1991, incorporated herein by reference for all purposes.

Within the context of wavelets, there is available a class of extremely fast (O(N)) basis transforms that have the added capability of sparsifying physical operators. O(N) is used to denote that the number of multiplications and additions required to transform an N-point signal is proportional to N. Furthermore, the degree to which an operator can be made sparse can be characterized in terms of mathematical characteristics of the operator, such as its smoothness.

In accordance with the present invention, a multiscale based controller is achieved by performing multiscale basis transformations on P and Q and implementing the controller in the space of multiscale basis coefficients. The transforms are designed so as to make the basis coefficients as decoupled as possible. The inventive approach involves, as will be explained in the following sections, approximations of P and Q. However, the invention facilitates balancing between approximation precision and sparsity in a structured way. Furthermore, the approximation error is well defined and can be used in the design of the control parameter Q. In particular, robustness of the closed-loop system G with respect to errors induced by basis transformations in accordance with the inventive method can be analyzed and in fact stability can be insured by adding constraints to the control optimization problem.

MULTISCALE BASES

In accordance with the present invention, an approach to multiscale control that is based on a class of basis transformations corresponding to the compactly-supported, orthonormal wavelet transform is disclosed. A suitable reference on wavelet transforms is I. Daubechies, "Orthonormal bases of compactly supported wavelets," Communications on Pure and Applied Mathematics, Vol. XLI, pp. 909–996, 1988, incorporated herein by reference for all purposes. The advantages of using this particular class of transforms for doing basis transformations on the plant P and the control parameter Q are twofold: 1) these transforms take advantage of scale-recursive algorithms that are extremely efficient (O(N)) where N is the number of samples of the discrete signal to be transformed and 2) the basis functions can be designed to be extremely effective in compressing operators, e.g. sparsifying transfer functions such as P and Q. To facilitate discussion, a brief overview of orthonormal wavelet bases is discussed below. This is then followed by a brief overview of results in using these bases to sparsify operators.

ORTHONORMAL WAVELETS OF COMPACT SUPPORT

The basic structure of any scale-based wavelet basis is based on the idea that a space of functions, for example $L^2(R)$, can be spanned by a basis set consisting of dilations and translations of a single, properly chosen, function.

$$\{\Psi(2^m x-n) \text{ for } m, n \text{ integer}\} \quad (13)$$

The basic wavelet function $\Psi$ is in general oscillatory and compressed in x, hence the name. For the purposes relevant to the present discussion, one of the more interesting aspects of bases of the type in eq. (13) is the fact that under certain conditions, transforming a signal in these basis functions can be interpreted as performing what is known as a multiresolution analysis of the signal. In this analysis the signal is represented at different resolutions using a scaling function, $\Phi$, which is used to blur the signal at different resolutions.

Figure 1:
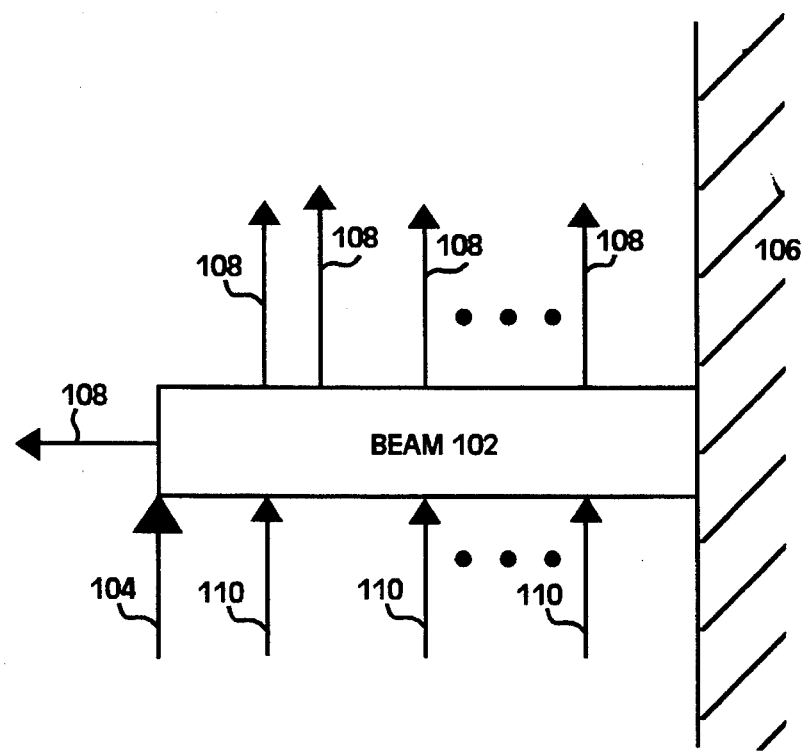
FIG. 1 shows in a simplified format a physical system for the purpose of introducing terms and concepts relevant to the disclosure herein.
Figure 6A:
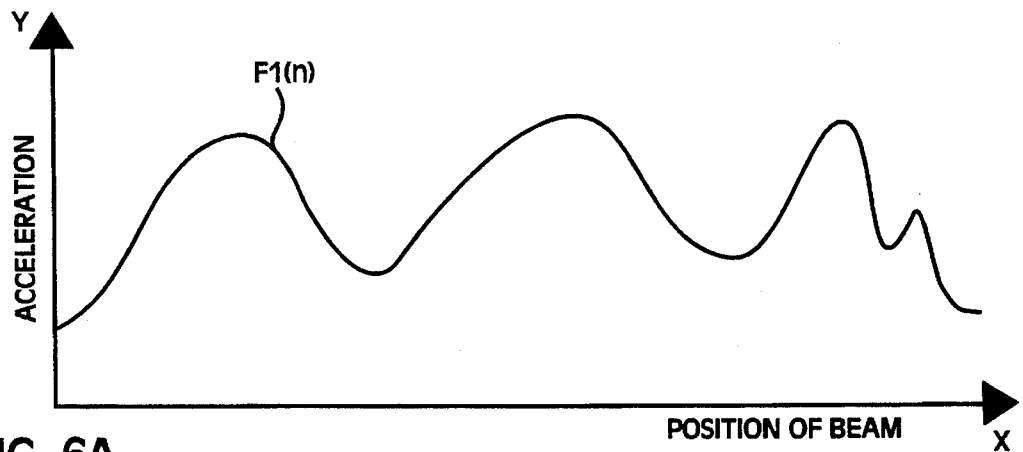
FIG. 6A shows in a simplified graph a function $f_1(n)$ representing the acceleration, measured at different positions on a beam, e.g. beam 102 of FIG. 1, after being impacted by a forcing function.
Figure 6B:
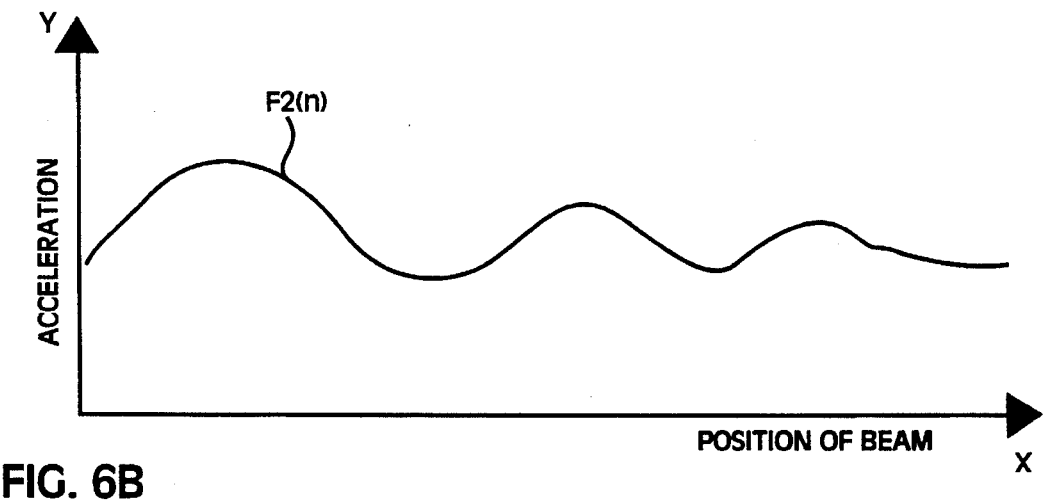
FIGS. 6B and 6C show different representations, $f_2(n)$ and $f_3(n)$ respectively, of the function of FIG. 6A, plotted in increasingly coarse scales FIGS. 7A and 7B respectively show the Haar wavelet and its associated scaling function.
Figure 6C:
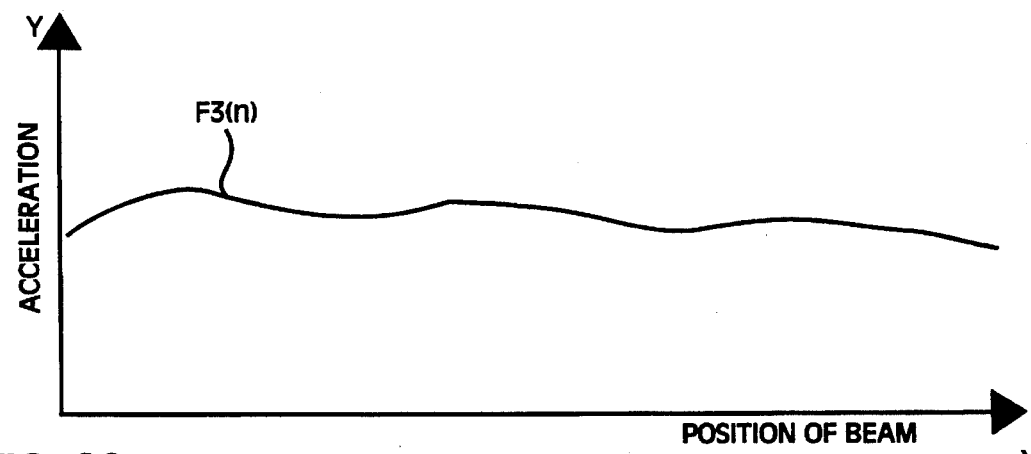

FIG. 6A shows in a simplified graph a function $f_1(n)$ representing the acceleration measured at different positions on a beam, e.g. beam 102 of FIG. 1, after being impacted by a forcing function. By plotting the function $f_1(n)$ of FIG. 6A in terms of different scale components, different representations of the same function may be obtained. FIGS. 6B and 6C show different representations, $f_2(n)$ and $f_3(n)$ respectively, of the function of FIG. 6A, plotted in increasingly coarse scales. For further information regarding multiresolution signal decomposition, reference may be made to S. G. Mallat, "A Theory for Multiresolution Signal Decomposition: The Wavelet Representation", IEEE Transactions on Pattern Anal. and Mach. Intel., Vol. PAMI-11, July 1989, pp. 674–693, incorporated by reference herein for all purposes.

The multiresolution analysis interpretation of the wavelet transform can be summarized as follows. The translations of the scaling function for a fixed scale m, $\{\Phi(2^m x-n)$ for n integer$\}$, span a subspace of $L^2(R)$. Representing a signal at this scale is achieved by projecting the signal onto this subspace. Further, the translations of the wavelet function for a fixed scale m, $\{\Psi(2^m x-n)$ for n integer$\}$, span the subspace defined by the difference between the scaling subspace at scale m and the scaling subspace at scale m−1. Additionally, the wavelet basis coefficients can be computed recursively in scale, resulting in an extremely efficient procedure.

Figure 7A:
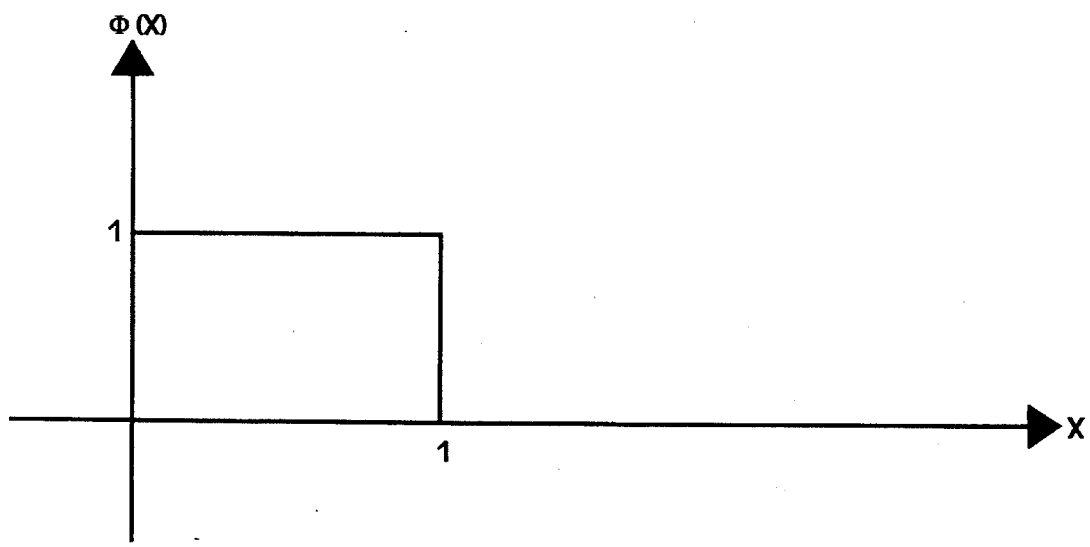
FIG. 7C shows the algorithm flow for lattices of 4-tap FIR filters h and g, where the c and d coefficients are computed recursively up the lattice.
Figure 7B:
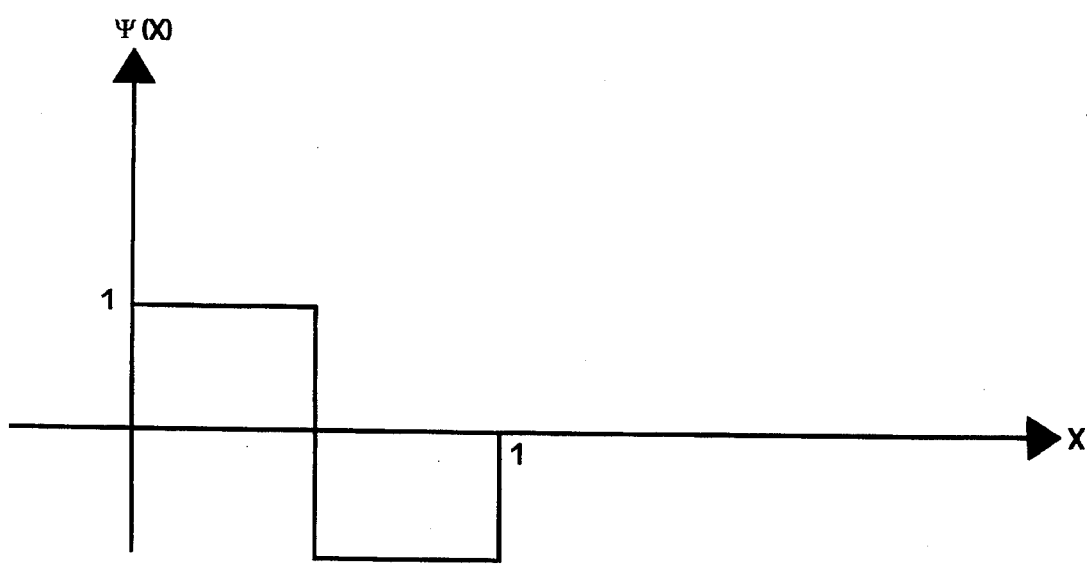

A simple example is the Haar wavelet and its associated scaling function as illustrated in FIGS. 7A and 7B respectively. In this case the scaling subspaces correspond to piecewiseconstant approximations of the signal at various step widths and the Haar function spans the orthogonal complement of the space corresponding to one step width with respect to the next finer space corresponding to half that width. A key observation from a computational standpoint is that the Haar basis coefficients at a particular scale can be computed from local differences of scaling coefficients. This is due to the fact that the Haar basis function at any scale is simply the difference of two scaling functions at that scale. The above observation serves as the basis for an extremely efficient scheme for computing the Haar transform based on local differences of the signal taken recursively in scale. In this recursion both the scaling coefficients as well as the wavelet coefficients are computed.

Extensions of the Haar wavelet may be derived for a class of wavelets that are compactly supported and orthonormal. Furthermore, a characteristic of this class of wavelets is that their transforms can be computed efficiently via a scale recursion as illustrated in the Haar case. Suppose the scaling coefficients and wavelet coefficients are defined as follows for some signal f(x).

$$c(m,n) = \int_{-\infty}^{\infty} \Phi(2^m x - n) f(x) \, dx \quad (14)$$

$$d(m,n) = \int_{-\infty}^{\infty} = \Psi(2^m x - n) f(x) \, dx \quad (15)$$

It is shown that the following recursion can be used to compute the scaling and wavelet coefficients recursively in scale from fine to coarse. For additional background information regarding the derivation of eqs. (14–17), reference may be made to the aforementioned article by I. Daubechies $$c(m,n) = \sum_k c(m+1,k) \, h(2n-k) \quad (16)$$

$$d(m,n) = \sum_k c(m+1,k) \, g(2n-k) \quad (17)$$

Each of the recursions in eqs. (16, 17) can be interpreted as discrete filtering followed by downsampling by a factor of two. Eqs. (16 and 17) represent the operation corresponding to $X_r$. In the case where h and g of eqs. (16, 17) are identical to h and g of eq. (18) (shown later), and the length of the signal used as inputs to eqs. (16, 17) equals the length of the signal used as input to eq. (18), $X_r = X_1^{-1}$. The scaling function filter h(n) is related to the wavelet filter g(n) by: $g(n) = (-1)^n h(1-n)$. Furthermore, for compactly supported wavelets, h(n) and g(n) are FIR filters (typically, though not necessarily, of length<12). The computational complexity for the algorithm described by eqs. (16, 17) is of the order O(NL), where L is the length of h and g, and N is the number of coefficients at the initial (finest) scale.

Figure 7C:
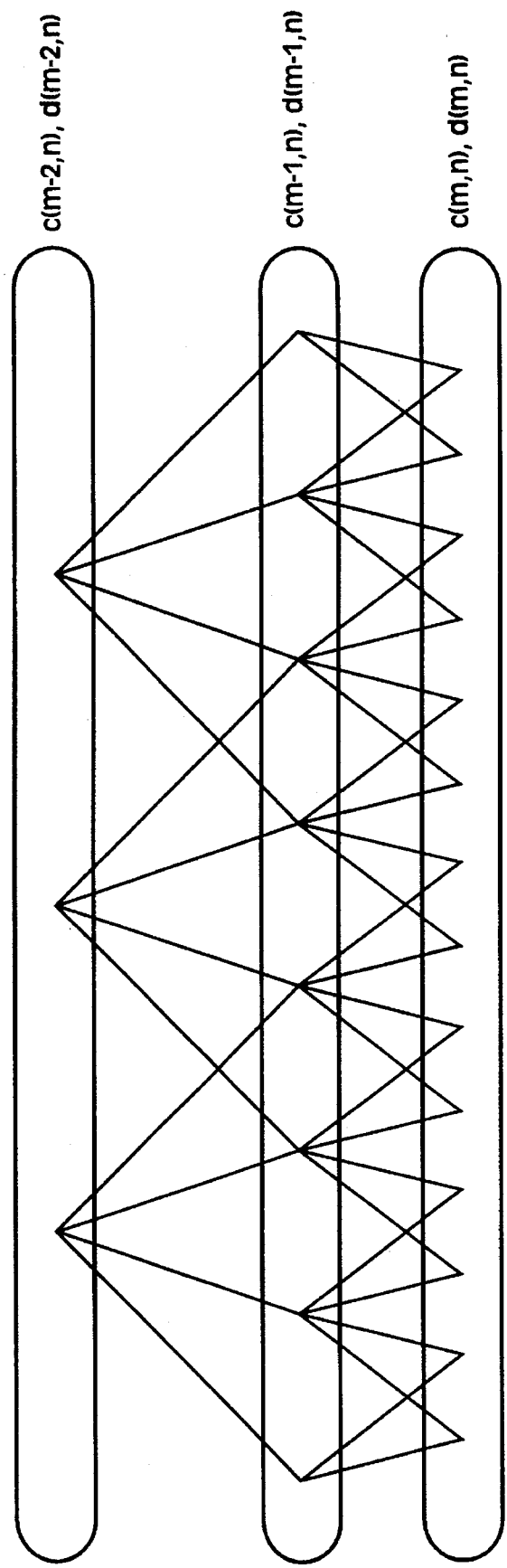

The algorithm flow is illustrated in the lattice of FIG. 7C for the 4-tap FIR filters h and g, where the c and d coefficients are computed recursively up the lattice.

The inverse wavelet transform, i.e. reconstructing the scaling coefficients at the finest scale from wavelet coefficients at all coarser scales, consists of the following recursion in scale from coarse to fine.

$$c(m+1, n) = \sum_k c(m,k) \, h(n-2k) + \sum_k d(m,k) \, g(n-2k) \quad (18)$$

Equation 18 represents the operation corresponding to $X_1$. In the case where h and g of eq. (18) are identical to h and g of eqs. (16, 17), and the length of the signal used as inputs to eq. (18) equals the length of the signal used as input to eqs. (16, 17), $X_1 = X_r^{-1}$. The algorithm flow would correspond to propagating down the lattice in FIG. 7C. Again, the computational complexity is O(NL).

In accordance with one aspect of the invention, these fast wavelet algorithms facilitate basis transformations on the control transfer functions P and Q, and, assuming the basis coefficients behave in a decoupled fashion, perform local computations on each basis coefficient to implement the control law. Furthermore, in accordance with yet another aspect of the present invention, the lattice algorithm facilitates a methodology for parallel processing in which processors are, for example, assigned to each node in the lattice.

COMPRESSION PROPERTIES OF WAVELETS

In accordance with the present invention, wavelet compression properties are exploited to sparsify the control transfer functions P and Q. In this manner, the control law may be implemented in multiscale bases in which basis coefficients are modified in a decoupled fashion.

In accordance with the present invention, wavelets can be effectively used to compress operators because of the important observation that the wavelet bases efficiently represent smooth operators. The property of these wavelets that allows such compression is one that is referred to herein as the property of "vanishing moments." This property is described as follows.

$$\int_{-\infty}^{\infty} \Psi(x) x^m \, dx = 0 \text{ for } m = 0, 1, \ldots M-1 \quad (19)$$

It is also true that the number: of vanishing moments, M, is proportional to the support length of the wavelet or the length of the discrete filters h(n) and g(n).

The reason this property is useful in compressing smooth operators is the fact that when integrated against a wavelet basis function, $\Psi(2^m x-n)$, satisfying eq. (19), a function f(x) is equal to $f(2^{-m} n)$ plus derivatives of f of order greater than or equal to M. For smooth functions, these higher order derivatives are small and thus, the wavelet coefficients are small. What this means for operators is that the compression efficiency of the wavelet basis can be related in terms of smoothness properties of the operator. A background reference on fast wavelet transforms by G. Beylkin, R. Coifman, and V. Rokhlin, "Fast Wavelet Transforms and Numerical Algorithms I," Communications on Pure and Applied Mathematics, Vol. XLIV, pp. 141–183, 1991 discusses, in an abstract manner, the class of Calderon-Zygmund integral operators, which have the property of being smooth away from the diagonal. In particular, 2D operators K(x,y) in this class satisfy the following:

$$|K(x,y)| \leq \frac{1}{|x-y|} \quad (20)$$

$$|\partial_x^M K(x, y)| + |\partial_y^M K(x, y)| \leq \frac{C_M}{|x-y|^{1+M}} \quad (21)$$

From the fact that the Mth partials of K decay strongly away from the diagonals, along with the vanishing moment property in eq. (19), it is apparent that the wavelet coefficients decay in a similar fashion as a function of the distance between coefficients, i.e. the distance between the centers of the basis functions corresponding to two coefficients.

Although operators in the Calderon-Zygmund class are discussed for the purpose of illustrating the compression properties of wavelets, the control transfer functions P and Q are, of course, not as simple. In fact they are frequency dependent and depend heavily on boundary conditions and material properties of the structure on which the actuators and sensors reside. The inventive multiscale approach is based on detailed characterization of P and Q terms of their smoothness properties and any possibly existing singularities. Further, the invention tailors multiscale bases to take advantage of smoothness of these transfer functions. As mentioned, the invention advantageously trades off complexity and regularity of the transform, for example as illustrated in the lattice of FIG. 7C, and the efficiency realized by such a transform, with the complexity of the transfer functions as measured by their degree of smoothness as a function of position (for example position of actuators and sensors on the structure).

Figure 8A:
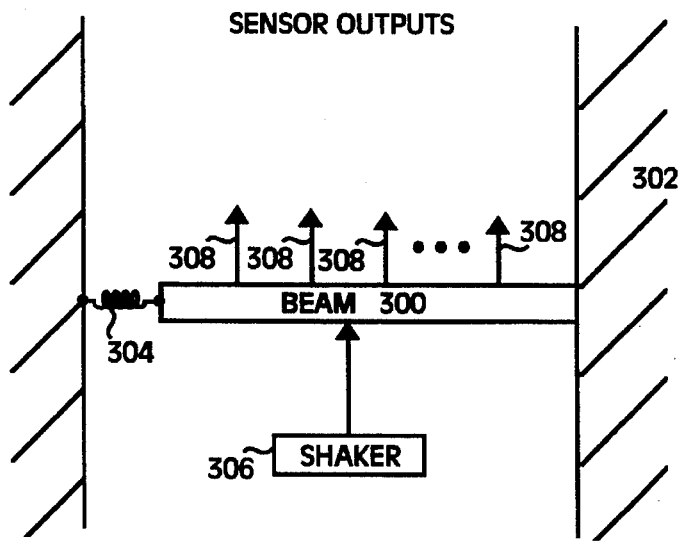
FIGS. 8A–B shows a simplified physical system and the associated simplified graph of the sensor outputs as a function of beam position.
Figure 8B:
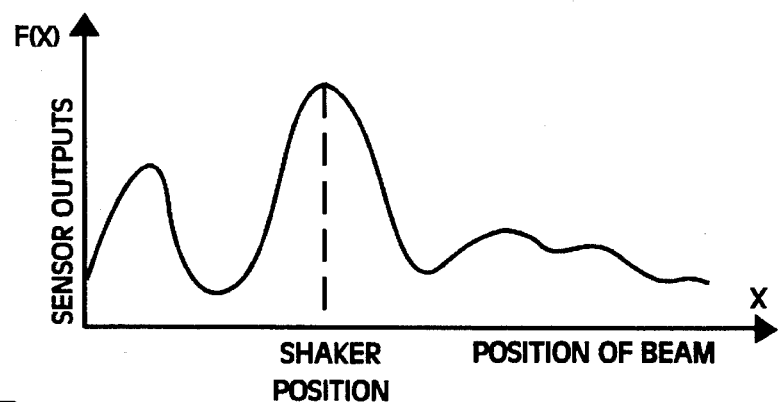

To further illustrate the foregoing, consider the simplified physical system represented in FIG. 8A and the associated simplified graph of the sensor outputs as a function of beam position in FIG. 8B. Referring now to FIG. 8A, there is shown a beam 300 attached to structure 302 at one end and to a spring 304 at the other end. Beam 300 is impacted by a forcing function supplied by a shaker 306, whose impact may be measured at various locations along the beam by sensors 308. FIG. 8B shows the graph of sensor outputs as a function of beam position. As is typically the case, the sensors' output is at its peak at the location impacted by shaker 306. As is readily recognizable to those of skill in the art, the function shown in FIG. 8B, which represents the response of the physical system of FIG. 8A to disturbances supplied by shaker 306, is a continuous function, i.e. it is smooth. Since only one shaker is shown in FIG. 8A, the graph of FIG. 8B represents the response of the physical system as measured by sensors 308 in response to the disturbance caused by that one actuator.

Figure 8C:
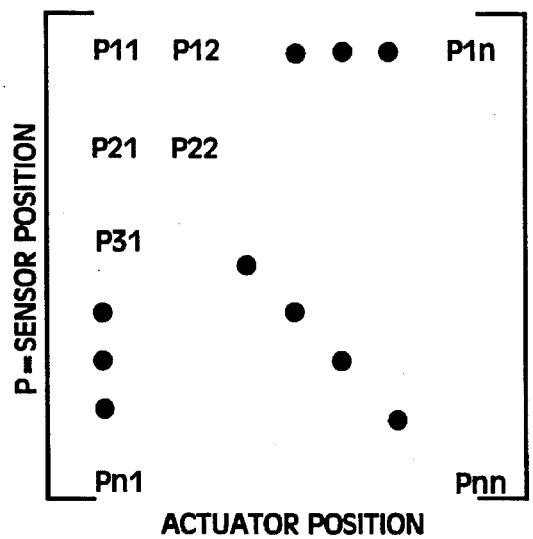
FIG. 8C shows in a simplified format a multi-column matrix representing a transfer function for a physical system in which there are multiple actuators.

In terms of the transfer function P, the mapping of actuator inputs into sensor outputs for each actuator is represented by a single column in the matrix representing transfer function P. If there are multiple actuators in the physical system, a representative transfer matrix P may resemble the multi-column matrix shown in FIG. 8C. In the ideal case, the matrix representing the transfer function P is then preferably sparsified down to a diagonal matrix to simplify computation and to decouple processors from one another if multiple processors are used to implement the controller.

Figure 9A:
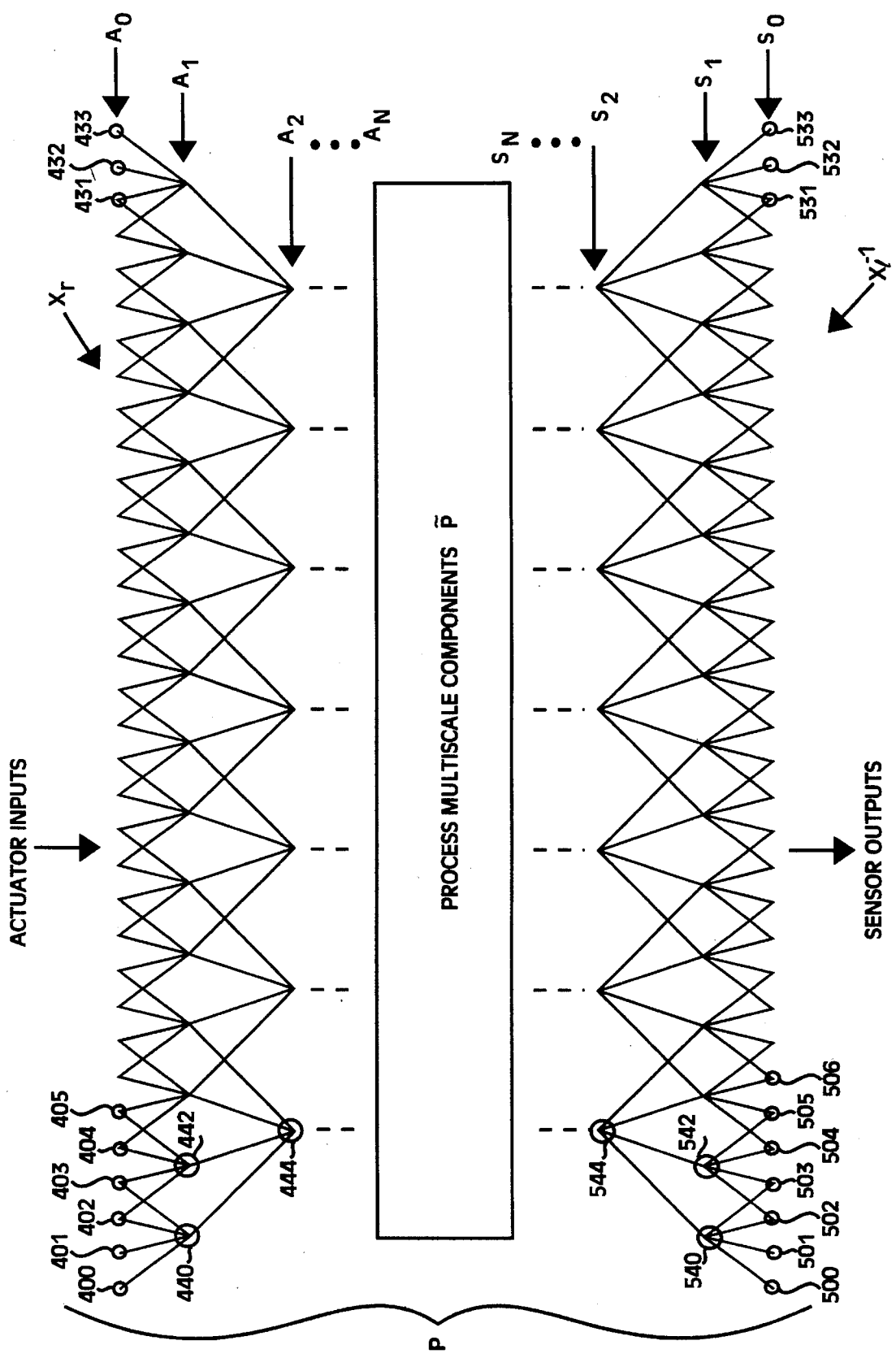
FIG. 9A shows in a simplified diagram the relationship between P, $\tilde{P}$ and the multiscale coefficients.

FIG. 9A shows in a simplified diagram the relationship between P, $\tilde{P}$ and the multiscale coefficients. As mentioned earlier, P represents the transfer function that maps the actuator inputs into the sensor outputs. In FIG. 9A, the actuator inputs and sensor outputs are represented by transform coefficients at multiple scales via wavelet transforms. Referring now to FIG. 9A, there are shown at the top a plurality of actuator inputs 400–433. Actuator inputs 400–433 are disposed at the actuator input finest scale $A_O$ as shown. There are also shown at the bottom of FIG. 9A a plurality of sensor outputs 501–533. Sensor outputs are disposed at the sensor output finest scale $S_O$ as shown.

In the prior art fully-interconnected controller scheme, every actuator is coupled to every sensor, resulting in a number of interconnections that equals the product of the number of sensors multiplied by the number of actuators for the implementation of transfer function P. The present invention performs a forward wavelet transform on the actuator inputs 400–433 by performing linear combinations on groups of actuator inputs. The size of the groups themselves are determined by the filter length of the wavelet filter, which is typically specified as powers of two. In the example of FIG. 9A, the filter length is four. Consequently, linear combinations are performed on actuator inputs in groups of four to derive at a coarser scale representation, i.e. scale $A_1$. As an example, the transform coefficient at node 440 at scale $A_1$ may be computed as follows.

$$X_{440} a1 X_{400} + a2 X_{401} + a3 X_{403}$$

where a1–a4 represent the transform coefficients that specify the wavelet transform and are the same for all similar four-branch groupings on the lattice for a filter length of 4. Implicit in the foregoing, the above mentioned forward wavelet transform is highly regular and recursive due to the nature of the wavelet transform, facilitating scalability and ease of implementation in software and hardware.

It is preferable that the forward wavelet transform be carried down the lattice of FIG. 9A as far as practicable. Each time a wavelet transformation operation is performed on the existing transform coefficients, a coarser scale results. In general, the coarser the actuator inputs are transformed, or decomposed, the fewer interconnections the controller will have in the end for a given performance threshold. The coarsest scale practicable is obtained when only one coefficient remains at the bottom of the actuator input lattice. However, engineering constraints, specific system requirements, and other concerns may require that decomposition stops at a coarse scale that falls short of the coarsest scale obtainable. The optimum stopping point is achieved by balancing the computational costs with the incremental increase in compression achieved by further decomposition. If not fully decomposed, the last scale is the scale at which no further decomposition and compression is performed. In that case, the transform coefficients at this last scale are typically fully interconnected with the transform coefficients at the last scale in the sensor output lattice where decomposition stops. As an extreme example, if no wavelet transformation is performed on the actuator inputs and sensor outputs, no compression would result and all coefficients at the last scale where decomposition stops, e.g. $A_O$ and $SO$ respectively in the diagram of FIG. 9A, must be fully interconnected.

For ease of illustration, the graphical decomposition of the lattice of FIG. 9A stops after two transform operations, i.e. after two additional coarse scales. In actuality, decomposition preferably extends as far as practicable as mentioned earlier.

In the diagram of FIG. 9A, the mapping of actuator input values into their respective transform coefficients represents the term $X_r$ in eq. (11). The mapping of transform coefficients representing actuator inputs into transform coefficients representing sensor outputs is itself accomplished by $\tilde{P}$ as shown. On the other hand, the mapping of transform coefficients representing sensor outputs into sensor output values is represented by $X_1^{-1}$ of eq. (11). Since P is known from actual measurement, and $X_1$ and $X_r$ are derived via wavelet transforms, $\tilde{P}$ can then be derived via the operation represented in eq. (9).

The derived transfer function $\tilde{P}$ is then thresholded to omit values in the matrix whose strength is below a predefined threshold percentage of the strength, e.g. the norm, of the original matrix such as the matrix of transfer function P(160). When values are omitted as falling below a predefined threshold, interconnections are severed. In the ideal case, a transformation coefficient only communicates with its mirror image. For example, transform coefficient 442 in the ideal case only needs to connect with and communicate with transform coefficient 542. As is apparent, the ideal case only requires a maximum of N connections for a system having N sensors and N actuators. If the strength of some mirror image connections is below the predefined threshold, it is possible to have fewer than N connections for the same system.

When connections are severed, accuracy decreases. This is because certain actuators and sensors are no longer directly in communication to perform their necessary feedforward and neutralization functions. In accordance with one aspect of the present invention, it is possible to trade off sparseness and accuracy by requiring transform coefficients to communicate not only with its mirror image but also with one or more neighbors, i.e. nearby coefficients in the lattice. For example, if the strength of the connections warrants it, transform coefficient 442 on the actuator input side may communicate with its mirror image, transform coefficient 542, as well as with transform coefficients 540 and 544.

The set of transform coefficients that a given transform coefficient on the other side of the lattice must connect with is termed the neighborhood. In any given physical system, the definition and size of the neighborhood depends on the characteristics of that physical system and the predefined threshold of performance. The characteristic of the physical system that determines the size of the neighborhood is called the locality of the neighborhood, which is a compression property. In the case of the beam example of FIG. 1, the size of the neighborhood depends, for example, on the interaction between the actuator and the beam, especially at sensor locations. In one embodiment, these physical characteristics are reflected in the calibration measurement of the transfer functions in FIG. 2 and may therefore be used to facilitate prediction of the appropriate neighborhood size.

Thresholding the derived transfer function $\tilde{P}$ results in a new transfer function $\overline{P}$. It should also be noted that the solution for $\tilde{P}$, and consequently $\overline{P}$, may be specific to a frequency or frequency band. This is because the response of a physical system to a forcing function or to actuator forces is different at different frequencies. Since the designed controller must account for responses over the full band of frequencies, the invention, in one embodiment, assigns a fixed interconnection structure over the full band of frequencies of interest. This fixed structure comprises the union of interconnection structures over all frequencies within the band of interest. To further improve efficiency, each interconnection in the fixed structure may then be subsampled at its appropriate rate. For example, coarse-scale coefficients may, in one embodiment, get sampled at a lower rate than fine-scale coefficients. When sampling frequency is reduced, the rate at which computations must be done to update the transfer function for that particular coefficient is concomitantly reduced.

Alternatively, the group of transfer functions $\overline{P}$ for the frequencies of interest may be subdivided into well-defined frequency bands, each of which can be subsampled at a lower sampling rate. The choice of frequency band is problem dependent and is driven by the analysis discussed earlier for determining the interconnection structure as a function of frequency. In one embodiment, for example, transfer functions are grouped in bands over which the interconnection structure remains constant or are relatively similar. Each band has its own input/output interconnection structure as determined from the analysis in the previous section. In one embodiment, a multirate scheme for subsampling each band can then be realized.

After a sparser transfer function $\overline{P}$ is derived, $\overline{P}$ is then used in place of the transfer function from which it is derived, i.e. $\tilde{P}$, to derive a sparser neutralization transfer function $P_s$ in accordance with eq. (11). The derived function $P_s$ will have sparse dependencies between transformed inputs and transformed outputs. Consequently, fewer interconnections are required to map actuator inputs into sensor outputs, reducing both the computational complexities and the interprocessor communication burden in implementing the neutralization path of the controller.

Note that when the filter length of the wavelet filter increases, the compression increases. In other words, $\overline{P}$ typically becomes sparser when the wavelet filter length of the wavelet filter increases. However, increasing the filter length increases, albeit linearly, the number of computations one must perform in order to accomplish transformation. By way of example, if the filter length is 4, as is shown in the diagram of FIG. 9A, the number of calculations to derive each transform coefficient above the finest scale is 4. If there are N actuator inputs, for example, the total number of calculations necessary to fully decompose the actuator input values is 4N. If the filter length is increased to 8, the total number of calculations necessary to fully decompose the actuator input values is now doubled, to 8N. The optimum filter length depends on specific system requirements and may be adapted as appropriate to suit individual physical systems.

Figure 9B:
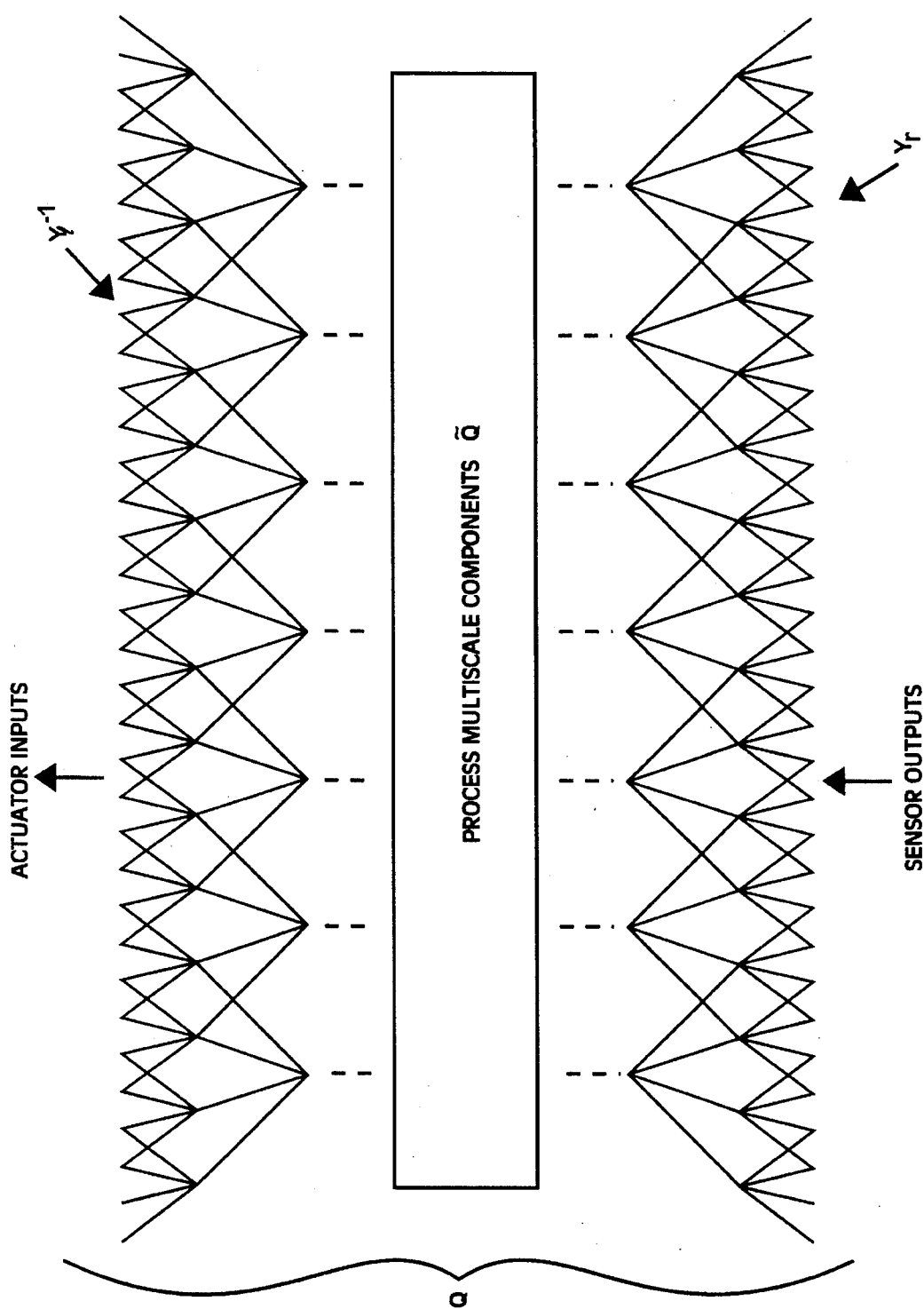
FIG. 9B shows in a simplifed diagram the relationship between Q, $\tilde{Q}$, and the multiscale coefficients.

In the same manner, FIG. 9B shows in a simplifed diagram the relationship between Q, $\tilde{Q}$, and the multiscale coefficients. In FIG. 9B, the sensor outputs at the bottom of the lattice is mapped into the actuator inputs at the top via $Y_1$ and $Y_r^{-1}$ respectively.

Figure 10:
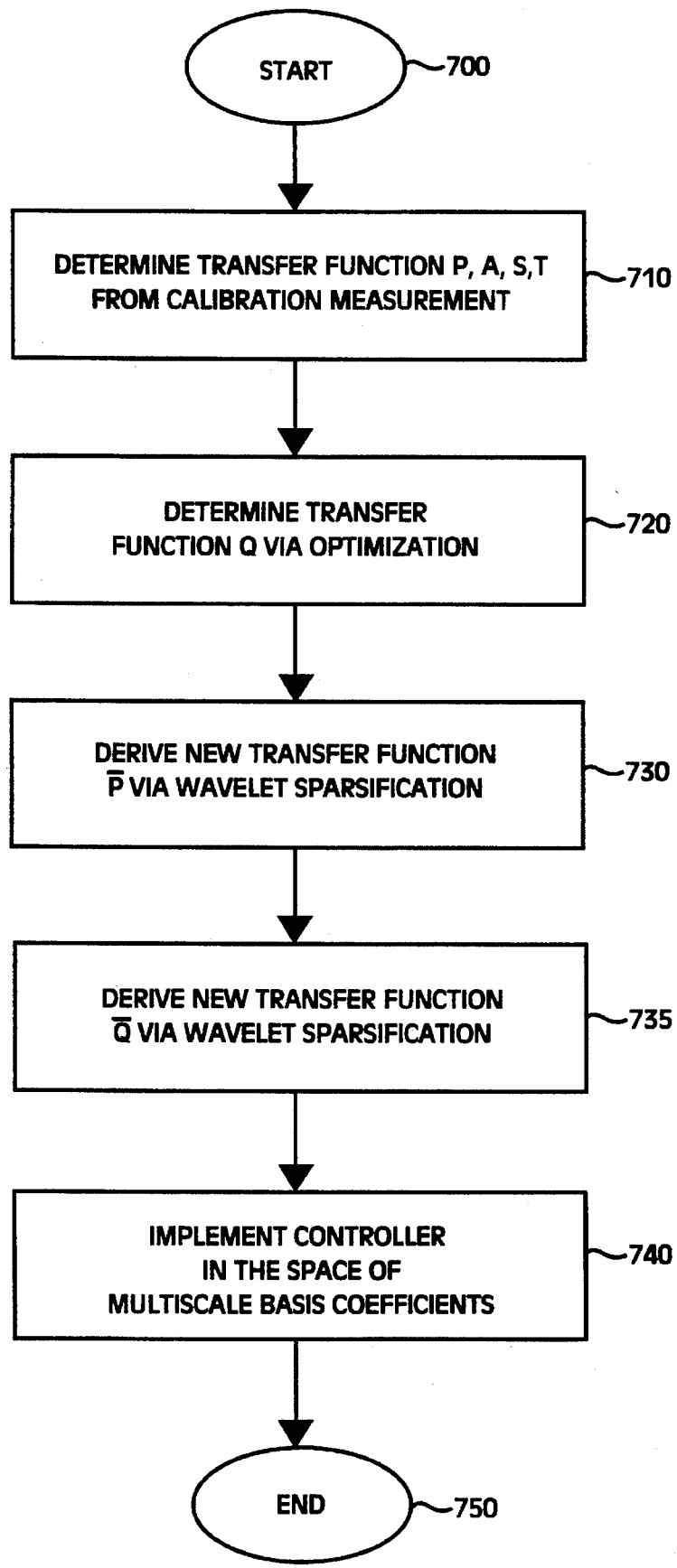
FIG. 10 shows in a simplified flowchart format the overall method for implementing a controller in accordance with the present invention.

FIG. 10 shows in a simplified flowchart format the overall method for implementing a controller in accordance with the present invention. FIG. 10 starts at step 700. From step 700, the method proceeds to step 710 where the transfer functions P, A, S, and T are determined from calibration measurements. Transfer function P was described in connection with FIGS. 2 and 3 while transfer function T, S, and A were described in connection with FIG. 2. In a control system in which P is implemented using FIR filters, the measurement in step 710 may be performed by, for example, exciting the physical system and measuring the impulse response. The methodologies and issues involved in measuring values for representing these transfer functions are well known. Suitable reference materials dealing with measuring these transfer functions include Bendat, Julius S. & Piersol, Allan G., "Random Data: Analysis and Measurement Procedures", Wiley-Interscience, 1971, pp. 286–343, and Ljung, Lennart, "System Identification: Theory for the User", Prentice-Hall, Inc., 1987, pp. 358–391, both of which are incorporated herein by reference for all purposes.

Figure 3:
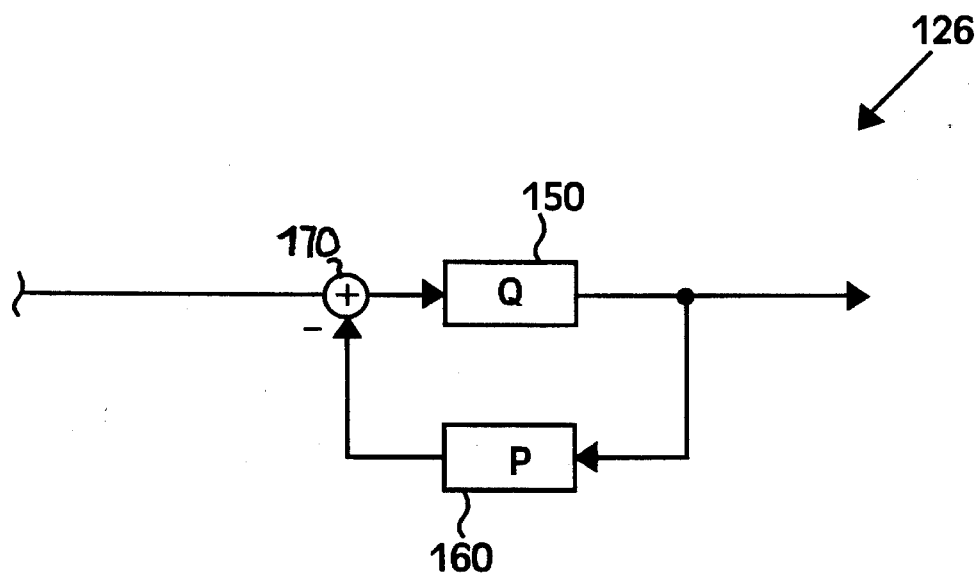
FIG. 3 shows in a simplified block diagram format a realization of a controller, e.g. transfer function K (126) of FIG. 2, using the Q-parameterization technique.
Figure 4A:
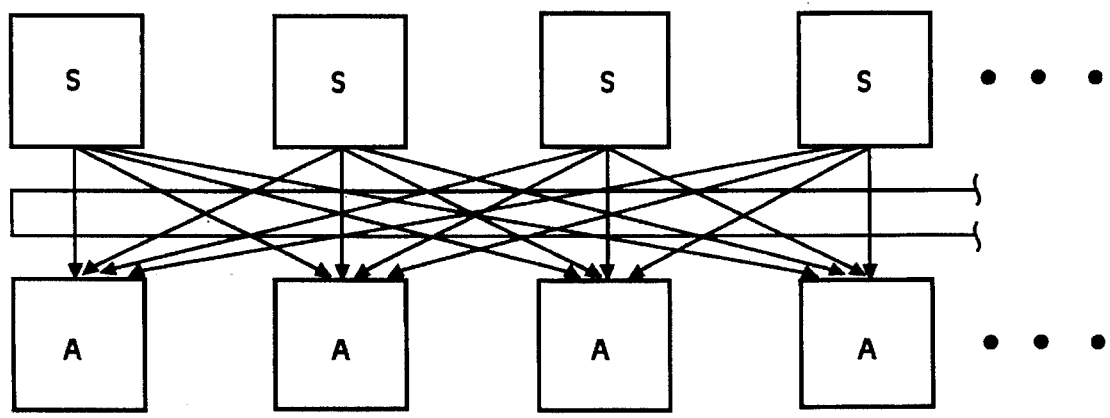
FIG. 4A shows a greatly simplified realization of transfer function Q (from sensor outputs to actuator inputs) for a controller which attempts to connect every sensor to every actuator.
Figure 4B:
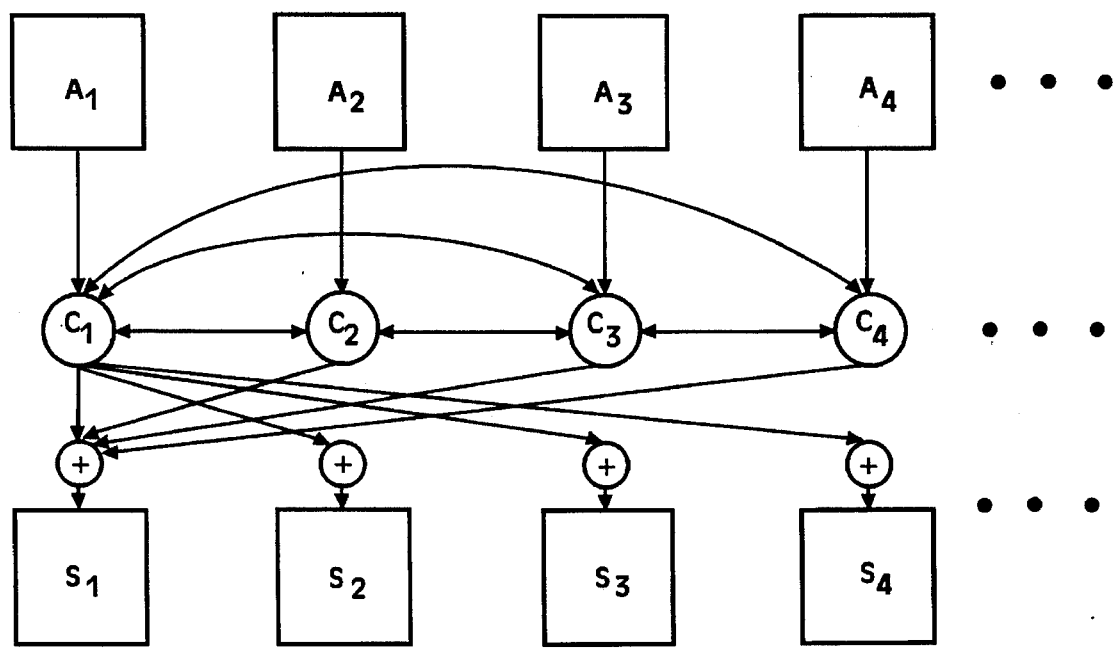
FIG. 4B shows a greatly simplified realization of transfer function P in which a plurality of processors C1–C4 are utilized to improve the speed at which the controller implemented by transfer function P can map actuator outputs into sensor inputs.

From step 710, the method proceeds to step 720 to determine the transfer function Q via optimization. Transfer function Q, as discussed in connection with FIG. 3, is used for implementing the feed-forward path. The determination of transfer function Q at this stage is known. For further information regarding the determination of transfer function Q, reference may be made to Bennett, W. H., "Digital Signal Processing Methods For Control of Vibrations in Structures", Technomic Publishing Col, Inc., 1991, pp. 783–795, and Golub, Gene H., Van Loan, Charles, F., "Matrix Computations", the John Hopkins U. Press, 1983, pp. 125–133, both of which are also incorporated herein by reference for all purposes.

From step 720, the method proceeds to step 730 to derive new transfer function $\bar{P}$ via wavelet sparsification. From step 730, the method proceeds to step 735 to derive new transfer functions $\bar{Q}$, also via wavelet sparsification. Once new transfer functions $\bar{P}$ and $\bar{Q}$ are derived, they are used to implement sparsified transfer function $P_s$ and sparsified transfer function $Q_s$ in step 740 in order to implement the controller in the space of multiscale basis coefficients. Mathematically speaking, the implementation of sparsified transfer function $P_s$ and sparsified transfer function $Q_s$ correspond to eqs. (11) and (12) as mentioned above:

$$P_s = X_1^{-1} \bar{P} X_r$$

$$Q_s = Y_1^{-1} \bar{Q} Y_r$$

although step 740 also involves building the physical controller for controlling the physical system of interest. From step 740, the method proceeds to step 750 where the steps of FIG. 10 end.

Figure 11:
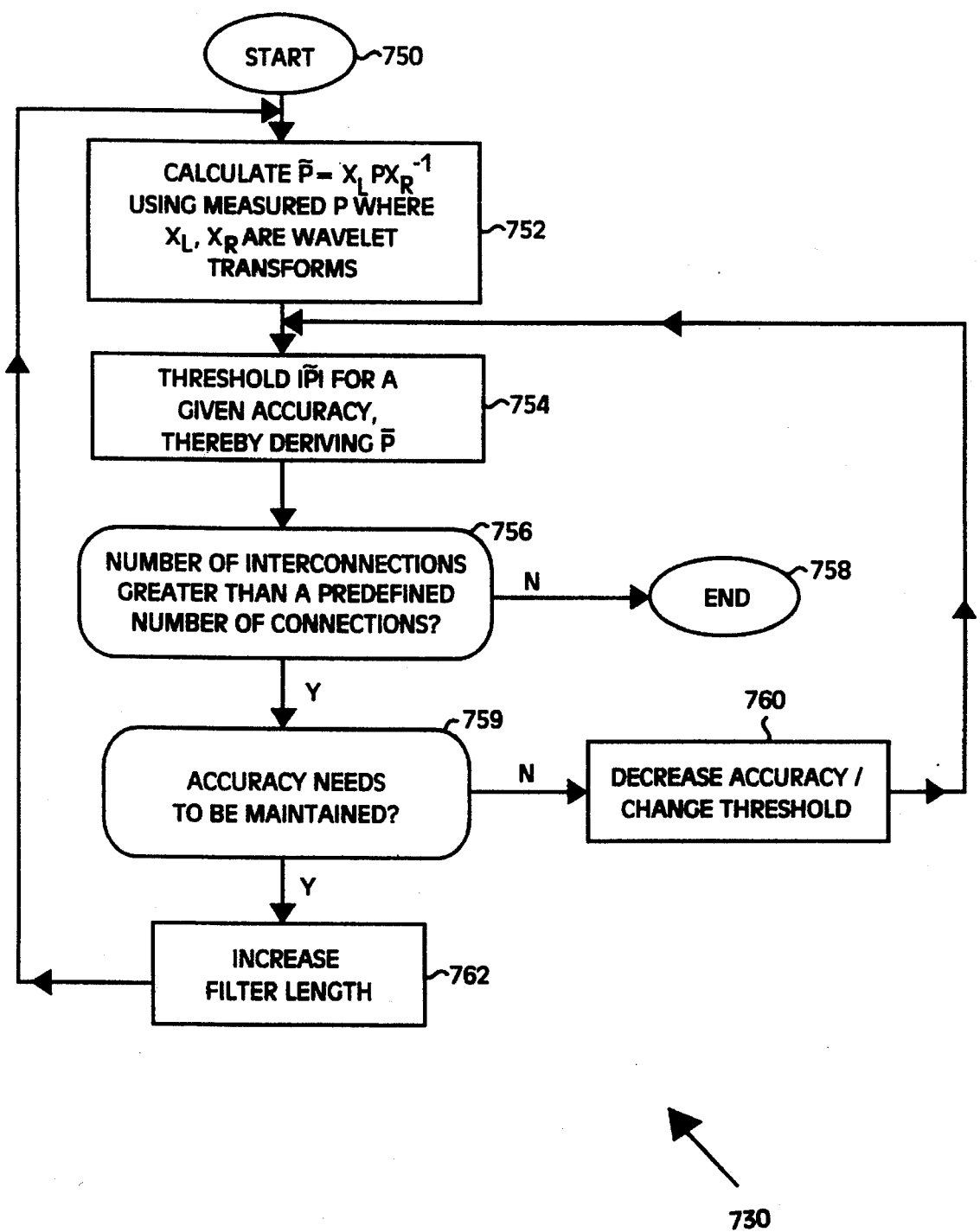
FIG. 11 shows in a simplified flow chart format the steps involved to derive new transfer function $\tilde{P}$ via wavelet sparsification step 730 of FIG. 10.

FIG. 11 shows in a simplified flow chart format the steps involved to derive new transfer function $\bar{P}$ via wavelet sparsification step 730. FIG. 11 starts at step 750. At the start, there is usually defined a default wavelet filter length and a default accuracy from which the default threshold may be derived for the purpose of deciding which interconnections to keep and which may be discarded from the derived transfer function $\tilde{P}$, which is derived in the next step 752. From step 750, the method proceeds to step 752 to calculate transfer function $\tilde{P}$ using eq. (9). For ease of illustration, eq. (9) is reproduced below.

$$\tilde{P} = X_1 P X_r^{-1} \tag{9}$$

where $X_1$ and $X_r$ are wavelet transforms as described earlier in connection with FIG. 9A. P is the measured transfer function in the neutralization path which is determined in step 710 of FIG. 10.

From step 752, the method proceeds to step 754 where the derived transfer function $\tilde{P}$ is thresholded for a given accuracy. By way of example, in the first iteration, the given accuracy equals the default accuracy. However, the accuracy and consequently the threshold itself may be changed as will be seen later in connection with step 760. Thresholding $\tilde{P}$ eliminates entries whose strength is below the given threshold. Notice that during thresholding, it is the magnitude of each entry in $\tilde{P}$ that is compared to the given threshold. Thresholding transfer function $\tilde{P}$ results in transfer function $\bar{P}$ as discussed earlier. From step 754. the method proceeds to step 756 where the newly derived transfer function $\bar{P}$ is tested to see whether it contains more interconnections than a predefined number of interconnections, i.e. whether $\bar{P}$ still has more entries remaining than the predefined number of interconnections. If it does not, a sufficiently sparse transfer function $\bar{P}$ has been derived and the method proceeds to step 758 where the steps of FIG. 11 end.

On the other hand, if the derived transfer function $\bar{P}$ has more interconnections than the predefined number of interconnections (as determined in step 756), the method proceeds to step 759 where the method determines whether the previously defined level of accuracy needs to be maintained. If it is decided that accuracy can be less than the previously defined level and still be acceptable, the method proceeds from step 759 to 760 where the previously defined level of accuracy is changed, thereby changing the threshold value. From step 760, the method returns to step 754 to threshold the derived transfer function $\tilde{P}$ with the newly changed threshold value.

On the other hand, if accuracy must be maintained (as determined in step 759), the method proceeds from step 759 to step 762 to increase the wavelet filter length. As mentioned earlier, increasing the wavelet filter length results in a sparser transfer function $\tilde{P}$ but requires more computations, albeit via a linear increase, to accomplish the wavelet transform. After the wavelet filter length is increased in step 762, transfer functions $X_1$ and $X_r$ must be derived anew with the new filter length, necessitating a return to step 752 from step 762. Thereafter, the method proceeds as shown in the flow chart of FIG. 11 until the number of interconnections in a derived transfer function $\bar{P}$ is satisfactorily sparse.

It should be noted that the steps of FIG. 11 must be performed for each frequency or band of frequencies of interest. The final product is preferably a multiscale/multirate transfer function $\bar{P}$ which accounts for substantially all frequencies of interest. However, as pointed out earlier, it is possible to synthesize different transfer functions $\bar{P}$ for well defined frequency bands, each of which may be subsampled at a lower sampling rate, from which a multirate scheme for subsampling each band may be derived.

Figure 12:
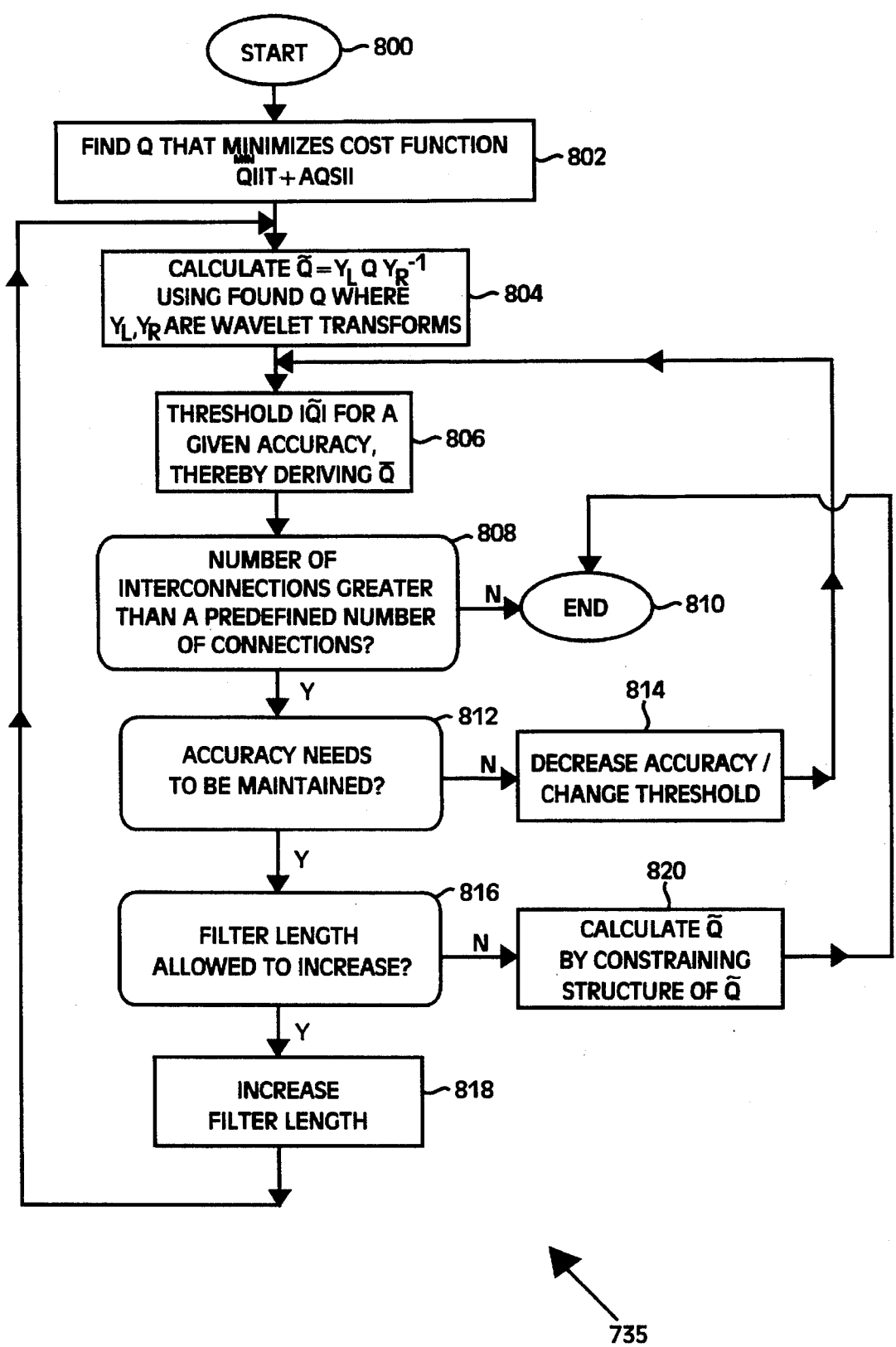
FIG. 12 shows in a simplified flow chart format the steps involved to derive new transfer function $\tilde{Q}$ via wavelet sparsification step 735 of FIG. 10.

FIG. 12 shows in a simplified flow chart format the steps involved to derive new transfer function $\bar{Q}$ via wavelet sparsification step 735 of FIG. 10. FIG. 12 starts at step 800. As in the case for the derivation of transfer function $\bar{P}$, there is usually defined a default wavelet filter length, and a default accuracy from which the default threshold may be derived for the purpose deciding which interconnection to keep and which may be discarded from the transfer function $\tilde{Q}$, which is derived in the next step 804. From step 800, the method proceeds to step 802 where a transfer function Q that minimizes the cost function stated in eq. (5) is determined.

For ease of reference, eq. (5) is reproduced below.

$$\min_{Q} \|T+AQS\| \quad (5)$$

Figure 2:
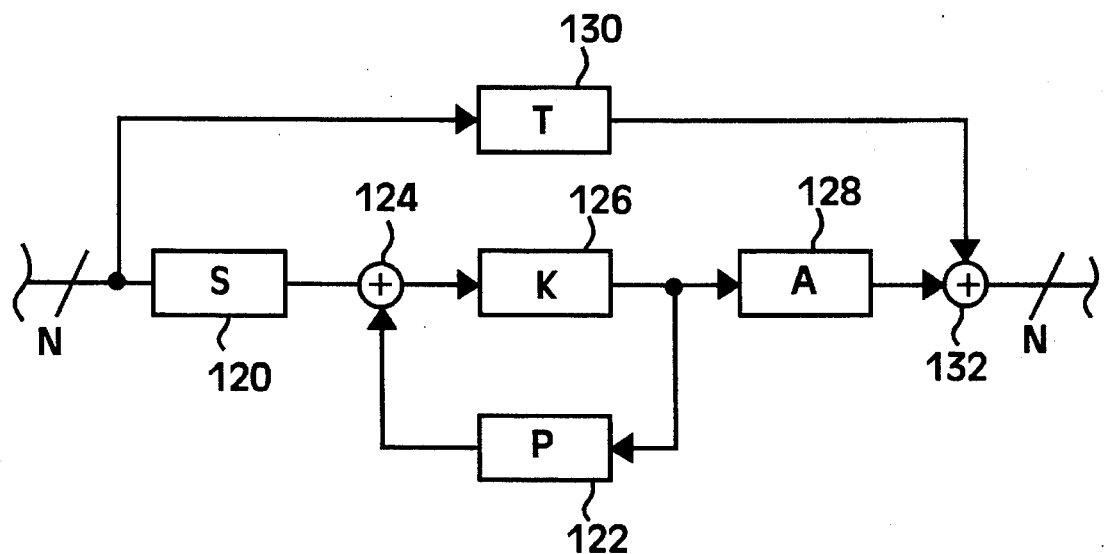
FIG. 2 shows in a simplified block diagram format a control system block diagram showing a plurality of blocks representing transfer functions.

Notice that it is assumed at step 802 that transfer function P of FIG. 3 is measured reasonably accurately, i.e. a reasonably accurate representation of transfer function P of FIG. 2. As will be seen later, if the measurement of P is inaccurate and results in an unacceptable transfer function $\overline{Q}$, constraints from the physical system may be introduced to facilitate the derivation of a more robust function $\overline{Q}$. These constraints may, for example, take the form of eq. (8) where these inaccuracies are modeled as an additive error as embodied by the matrix transfer function D.

From step 802, the method proceeds to step 804 where the transfer function $\overline{Q}$ is derived using eq. (10). For ease of reference, eq. (10) is reproduced below.

$$\overline{Q}=Y_1 Q Y_r^{-1} \quad (10)$$

where Y1 and Yr are wavelet transforms as described earlier in connection with FIG. 9b. Transfer function Q at this stage represents the transfer function Q that is derived from the minimization procedure discussed in connection with step 802.

From step 804, the method proceeds to step 806 where the derived transfer function $\tilde{Q}$ is thresholded for a given accuracy. By way of example, in the first iteration, the given accuracy equals the default accuracy. However, the accuracy and consequently the threshold itself may be changed as will be seen later in connection with step 814. Thresholding $\tilde{Q}$ eliminates entries whose strength is below the given threshold. Notice that during thresholding, it is the magnitude of each entry in $\tilde{Q}$ that is compared to the given threshold.

Thresholding transfer function $\tilde{Q}$ results in transfer function $\overline{Q}$ as discussed earlier. From step 806, the method proceeds to step 808 where the newly derived transfer function $\overline{Q}$ is tested to see whether it contains more interconnections than a predefined number of interconnections, i.e. whether $\overline{Q}$ still has more entries remaining than the predefined number of interconnections. If it does not, a sufficiently sparse transfer function $\overline{Q}$ has been derived and the method proceeds to step 810 where the steps of FIG. 12 end.

On the other hand, if the derived transfer function $\overline{Q}$ has more interconnections than the predefined number of interconnections (as determined in step 808), the method proceeds to step 812 where the method determines whether the previously defined level of accuracy needs to be maintained. If it is decided that accuracy can be less than the previously defined level and still be acceptable, the method proceeds from step 812 to 814 where the previously defined level of accuracy is changed, thereby changing the threshold level. From step 814, the method returns to step 806 to threshold the derived transfer function $\overline{Q}$ with the newly changed threshold.

On the other hand, if accuracy must be maintained (as determined in step 812), the method proceeds from step 812 to step 816 to determine whether the wavelet filter length can be increased. If it is possible to increase the wavelet filter length (as determined in step 816), the method proceeds to step 818 to increase the wavelet filter length. As mentioned earlier, the increase in the wavelet filter length results in a sparser transfer function $\tilde{Q}$ but requires more computations, albeit via a linear increase, to accomplish the wavelet transform. After the wavelet filter length is increased in step 818, transfer functions $Y_l$ and $Y_r$ must be derived anew with the new filter length, necessitating a return to step 804 from step 818.

On the other hand, if the wavelet filter length cannot be increased (as determined in step 816), the method proceeds from step 816 to step 820 to calculate transfer function $\overline{Q}$ directly by constraining the structure of $\overline{Q}$. From step 820, the method proceeds to step 810 where, as mentioned earlier, the steps of FIG. 12 end. In one embodiment, $\overline{Q}$ is derived by solving the following minimization problem:

$$\min_{\overline{Q}} \|T+\overline{AQS}\|$$

$$\|E\overline{Q}\|_\infty < 1$$

$$\|F\overline{Q}\|_\infty < 1$$

where $$\overline{Q}=Y_1 Q Y_r^{-1}$$

$$\overline{A}=A\, Y_1^{-1}$$

$$\overline{S}=Y_r S$$

The transfer function matrix E in this case may represent inaccuracies in modeling Q, and the transfer function F may represent inaccuracies in modeling P.

It should be noted that the steps of FIG. 12 must be performed for each frequency or band of frequencies of interest. Like the case of FIG. 11, the final product is preferably a multiscale/multirate transfer function $\overline{Q}$ which accounts for substantially all frequencies of interest. However, as pointed out earlier, it is possible to synthesize different transfer functions $\overline{Q}$ for well defined frequency bands, each of which may be subsampled at a lower sampling rate, from which a multirate scheme for subsampling each band may be derived.

After a sparser function $\overline{Q}$ is derived, $\overline{Q}$ is then used in place of the transfer function from which it is derived, i.e. $\tilde{Q}$, to derive a sparser feed-forward transfer function $Q_s$ in accordance with eq. (12).

As mentioned previously, this invention advantageously facilitates implementation of an efficient real-time controller in a multi-input/multi-output system. A possible application of this invention is in enabling the imbedding of large numbers of sensors and actuators in composite materials for controlling the surface of a structure. Such smart materials could be used to form the surface of an aircraft wing, providing a way for allowing the wing to change its surface characteristics in the presence of turbulent airflow. A feedback control system could be designed to help, for example, stabilize the wing in the presence of strong disturbances or at high velocities. Also, feedback control could be used to alter the shape of the wing in real-time to reduce drag. By sparsifying the interconnections between the sensors and actuators, this invention provides a practical method for developing a control system for such a dense grid of transducers, a system that would be an essential component of such a "smart" materials concept.

As is apparent from the disclosure herein, this invention permits the design of control systems with large (potentially thousands) numbers of inputs and outputs by performing the computations required of a fully interconnected system in a multiscale hierarchy. This multiscale structure both allows for efficient implementation of the controller for real-time application as well as suggests a highly scalable multiprocessor architecture using processors with limited interconnections. Thus, the multiscale control approach in this invention allows for the design of a practical control system for applications such as the control of smart materials as well as for the implementation of such a system in a realizable multiprocessor scheme.

Although only a few embodiments of the present invention have been described in detail, it should be understood that the present invention may be embodied in many other specific forms without departing from the spirit or scope of the invention. In view of the foregoing, it should be apparent that the present examples are to be considered as illustrative and not restrictive, and the invention is not to be limited to the details given herein, but may be modified within the scope of the appended claims.

I claim:

1. A method for implementing a controller in a system having a plurality of sensors and a plurality of actuators, comprising:

measuring a transfer function P with said sensors, said measured transfer function P representing a neutralization path in a Q-parameterized version of said controller;

designing a transfer function Q, said designed transfer function Q representing the feed forward path in said Q-parameterized version of said controller; and sparsifying both said transfer functions P and Q for a given accuracy threshold using wavelet transforms, thereby forming transfer functions Ps and Qs respectively for implementing said controller.

2. The method of claim 1 wherein said sparsifying step further comprises:

computing a transfer function $\tilde{P}=X_1 P X_r^{-1}$ wherein P representing said measured transfer function P, $X_1$ represents the forward wavelet transforms on outputs of said plurality of sensors, and $X_r^{-1}$ represents the inverse wavelet transforms for deriving inputs of said plurality of actuators.

3. The method of claim 2 wherein said sparsifying step further comprises:

computing a transfer function $\tilde{Q}=Y_1 Q Y_r^{-1}$ wherein Q represents said designed transfer function Q, $Y_1$ represents the forward wavelet transforms on outputs of said sensors, and $Y_r^{-1}$ represents the inverse wavelet transforms for deriving outputs of said sensors.

4. The method of claim 3 wherein the step of designing comprises the substep for determining said transfer function Q, said transfer function Q being the transfer function that minimizes the following cost function:

$$\min_Q \|T+AQS\|$$

where D is a system-dependent transfer function.

5. The method of claim 3 wherein said designing step comprises the step of determining said transfer function Q, said transfer function Q being the transfer function that minimizes the following cost function:

$$\min_Q \|T+AQS\|.$$

6. The method of claim 3 wherein said sparsifying step further comprises:

thresholding said transfer function $\tilde{P}$ for a given accuracy threshold, thereby deriving a transfer function $\bar{P}$.

7. The method of claim 6 wherein said sparsifying step further comprises the step of deriving transfer function $P_s$ from said transfer function $\bar{P}$, said transfer function $P_s$ being derived in accordance with the following equation:

$$P_s=X_1^{-1}\bar{P}X_r$$

wherein said transfer function $P_s$ represents a sparsified version of said transfer function P.

8. The method of claim 7 wherein said sparsifying step further comprises the step of deriving transfer function $Q_s$ from said transfer function $\bar{Q}$, said transfer function $Q_s$ being derived in accordance with the following equation:

$$Q_s=Y_1^{-1}\bar{Q}Y_r$$

wherein said transfer function Qs represents a sparsifted version of said transfer function Q.

9. Circuitry configurable for coupling with and controlling a given plant via multiple actuators and multiple sensors, said circuitry operable to measure outputs from said multiple sensors, said circuitry further operable to generate control signals for said multiple actuators, said circuitry implementing a control transfer function for transforming said measured outputs to said control signals, said control transfer function having:

a feed-forward path, said feed-forward path representing direct communication paths from a first plurality of nodes, said first plurality of nodes representing transform coefficients of a sensor output wavelet transform lattice to a second plurality of nodes, said second plurality of nodes representing transform coefficients of a actuator input wavelet transform lattice; and a neutralization path, said neutralization path representing direct communication paths from a third plurality of nodes, said third plurality of nodes representing transform coefficients of an actuator input wavelet transform lattice to a fourth plurality of nodes, said fourth plurality of nodes representing transform coefficients of a sensor output wavelet transform lattice.

10. The circuitry of claim 9 wherein said feedforward path represents a first sparsifted transfer function matrix.

11. The circuitry of claim 10 wherein said neutralization path represents a second sparsifted transfer function matrix.

12. The circuitry of claim 9 wherein said circuit comprises multiple parallel processors.

13. The circuitry of claim 12 wherein at least one of said multiple parallel processors are configured to communicate via a limited number of interconnections with at least one of said sensors, actuators, and other processors of said multiple parallel processors.

14. The circuitry of claim 9, wherein said actuators and sensors are configured to control smart materials.

15. A method for implementing a controller in a multi-input/-multi-output system having a plurality of actuators, the method comprising;

measuring a transfer function P with said sensors, said transfer function P representing the neutralization path in a Q-parameterized version of said controller;

designing a transfer function Q said transfer function Q representing the feed forward path in said Q-parameterized version of said controller;

deriving transfer function $\tilde{P}$ from said measured transfer function P, a transfer function $X_1$ and a transfer function $X_r^{-1}$, said transfer functions $X_1$ and $X_r^{-1}$ representing wavelet transforms;

deriving transfer function $\tilde{Q}$ from said designed transfer function Q, a transfer function $Y_1$ and a transfer function $Y_r^{-1}$, said transfer functions $Y_1$ and $Y_r^{-1}$ representing wavelet transforms;

thresholding said transfer function $\tilde{P}$ with respect to a given accuracy threshold, thereby deriving a transfer function $\bar{P}$;

thresholding said transfer function $\tilde{Q}$ with respect to said given accuracy threshold, thereby deriving a transfer function $\bar{Q}$;

deriving a transfer function Ps from said transfer function $\bar{P}$;

deriving a transfer function Qs from said transfer function $\bar{Q}$; and implementing said controller via Q-parametedzation using said transfer function Ps and Qs.

16. A method for controlling a system having a plurality of sensors and a plurality of actuators, the method including the steps of:

a) providing a control transfer function $K=(I+Q_sP_s)^{-1}Q_s$, wherein $Q_s$ is a sparsifted version of a feed-forward transfer function Q, and $P_s$ is a sparsifted version of a neutralization transfer function P, both Q and P being designed for the system according a Q-parameterization technique, said sparsifted transfer functions $Q_s$, and $P_s$ being sparsifted for a predefined accuracy threshold using wavelet transforms;

b) measuring an output for each of said plurality of sensors thereby generating a plurality of sensor measurements;

c) generating a plurality of actuator inputs by transforming said plurality of sensor measurements by said control transfer function K; and d) actuating said plurality of actuators according to said plurality of actuator inputs, wherein repeatedly performing steps b)–d) results in maintaining the system at a desired system set point.

17. A method as recited in claim 16 wherein said method is implemented by a digital processor.

18. A method as recited in claim 17 wherein said digital processor is an application specific integrated circuit (ASIC).

19. A method as recited in claim 16 wherein said control transform function K is implemented as a multiplicity of parallel processes.

20. The method of claim 19 wherein said multiplicity of parallel processes are performed via parallel processors, at least one of said parallel processors being configured to communicate via a limited number of interconnections with at least one of said sensors, actuators, and other processors of said multiple parallel processors.

21. A method as recited in claim 16 wherein the step of providing a control transfer function includes designing the transfer function Q as the transfer function that minimizes the following cost function:

$$\min_Q \|T+AQS\|.$$

22. A method as recited in claim 16 wherein the step of providing a control transfer function includes measuring the transfer function P for the system.

23. A method as recited in claim 22 wherein the step of providing a control transfer function further includes thresholding said transfer function $\tilde{P}$ for a given accuracy threshold, thereby deriving a transfer function $\bar{P}$.

24. A method as recited in claim 23 wherein said step of providing a control transfer function further includes deriving said transfer function $P_s$ from said transfer function $\bar{P}$, said transfer function $P_s$ being derived in accordance with the following equation:

$$P_s = X_1^{-1}\bar{P}X_r$$

wherein said transfer function $P_s$ represents a sparsifted version of said transfer function P.

25. A method as recited in claim 24 wherein said step of providing a control transfer function further includes deriving said transfer function $Q_s$ from said transfer function $\bar{Q}$, said transfer function $Q_s$ being derived in accordance with the following equation:

$$Q_s = Y_1^{-1}\bar{Q}Y_r$$

wherein said transfer function $Q_s$ represents a sparsifted version of said transfer function Q.

26. A method as recited in claim 22 wherein the step of providing a control transfer function further includes computing a transfer function $\tilde{P}=X_1P X_r^{-1}$ wherein P represents said measured transfer function P, $X_1$ represents the forward wavelet transforms on outputs of said plurality of sensors, and $X_r^{-1}$ represents the inverse wavelet transforms for deriving inputs of said plurality of actuators.

27. A method as recited in claim 26 wherein providing a control transfer function further includes computing a transfer function $\tilde{Q}=Y_1Q Y_r^{-1}$ wherein Q representing said designed transfer function Q, $Y_1$ represents the forward wavelet transforms on outputs of said sensors, and $Y_r^{-1}$ represents the inverse wavelet transforms for deriving outputs of said sensors.

28. A computer readable medium storing a computer program for implementing a controller in a system having a plurality of sensors and a plurality of actuators, the computer program comprising the computer instructions for:

measuring a transfer function P with said sensors, said measured transfer function P representing a neutralization path in Q-parameterized version of said controller.

designing a transfer function Q, said designed transfer function Q representing the feed forward path in said Q-parameterized version of said controller; and sparsifying both said transfer functions P and Q for given accuracy threshold using wavelet transforms, thereby forming transfer functions Ps and Qs respectively for implementing said controller.

29. The computer readable medium of claim 28 wherein said computer instruction for sparsifying further comprises instructions for:

computing a transfer function $\tilde{P}=X_1P X_r^{-1}$ wherein P representing said measured transfer function P, $X_1$ represents the forward wavelet transforms on outputs of said plurality of sensors, and $X_r^{-1}$ represents the inverse wavelet transforms for deriving inputs of said plurality of actuators.

* * * * *